United States Patent
Guthrie et al.

(10) Patent No.: US 10,157,134 B2
(45) Date of Patent: *Dec. 18, 2018

(54) DECREASING THE DATA HANDOFF INTERVAL FOR A RESERVED CACHE LINE BASED ON AN EARLY INDICATION OF A SYSTEMWIDE COHERENCE RESPONSE

(71) Applicant: INTERNATIONAL BUSINESS MACHINES CORPORATION, Armonk, NY (US)

(72) Inventors: Guy L. Guthrie, Austin, TX (US); Jonathan R. Jackson, Austin, TX (US); William J. Starke, Round Rock, TX (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 15/095,675

(22) Filed: Apr. 11, 2016

(65) Prior Publication Data

US 2017/0293558 A1 Oct. 12, 2017

(51) Int. Cl.
*G06F 12/00* (2006.01)
*G06F 13/00* (2006.01)
(Continued)

(52) U.S. Cl.
CPC ........ *G06F 12/0815* (2013.01); *G06F 12/084* (2013.01); *G06F 12/0811* (2013.01);
(Continued)

(58) Field of Classification Search
CPC ............. G06F 12/0815; G06F 12/0811; G06F 12/084; G06F 12/0842; G06F 12/0831; G06F 12/0893; G06F 2212/1024; G06F 2212/6042; G06F 2212/60; G06F 2212/621; H04L 45/7457
(Continued)

(56) References Cited

U.S. PATENT DOCUMENTS

| 2008/0016278 | A1* | 1/2008 | Clark | G06F 12/0817 711/118 |
| 2011/0161590 | A1* | 6/2011 | Guthrie | G06F 9/30087 711/122 |
| 2014/0250276 | A1* | 9/2014 | Blaner | G06F 12/0831 711/146 |

* cited by examiner

*Primary Examiner* — Shane Woolwine
(74) *Attorney, Agent, or Firm* — Brian F. Russell; Steve L. Bennett

(57) ABSTRACT

A multiprocessor data processing system includes multiple vertical cache hierarchies supporting a plurality of processor cores, a system memory, and a system interconnect. In response to a load-and-reserve request from a first processor core, a first cache memory supporting the first processor core issues on the system interconnect a memory access request for a target cache line of the load-and-reserve request. Responsive to the memory access request and prior to receiving a systemwide coherence response for the memory access request, the first cache memory receives from a second cache memory in a second vertical cache hierarchy by cache-to-cache intervention the target cache line and an early indication of the systemwide coherence response for the memory access request. In response to the early indication and prior to receiving the systemwide coherence response, the first cache memory initiating processing to update the target cache line in the first cache memory.

18 Claims, 18 Drawing Sheets

(51) Int. Cl.
*G06F 13/28* (2006.01)
*G06F 12/0815* (2016.01)
*G06F 12/0831* (2016.01)
*G06F 12/0811* (2016.01)
*G06F 12/084* (2016.01)
*G06F 12/0842* (2016.01)
*G06F 12/0893* (2016.01)

(52) U.S. Cl.
CPC ...... *G06F 12/0831* (2013.01); *G06F 12/0842* (2013.01); *G06F 12/0893* (2013.01); *G06F 2212/1024* (2013.01); *G06F 2212/6042* (2013.01); *G06F 2212/621* (2013.01)

(58) Field of Classification Search
USPC .......................................... 711/108, 121, 146
See application file for complete search history.

DECREASING THE DATA HANDOFF INTERVAL FOR A RESERVED CACHE LINE BASED ON AN EARLY INDICATION OF A SYSTEMWIDE COHERENCE RESPONSE

BACKGROUND

The present invention relates to data processing and, more particularly, to improving data processing system performance by decreasing the data handoff interval in a multiprocessor data processing system based on an early indication of a systemwide coherence response.

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multilevel vertical cache hierarchy, the lower level(s) of which may be shared by one or more processor cores.

Because multiple processor cores may request write access to a same memory block (e.g., cache line or sector) and because cached memory blocks that are modified are not immediately synchronized with system memory, the cache hierarchies of multiprocessor computer systems typically implement a cache coherence protocol to ensure at least a minimum required level of coherence among the various processor core's "views" of the contents of system memory. The minimum required level of coherence is determined by the selected memory consistency model, which defines rules for the apparent ordering and visibility of updates to the distributed shared memory. In all memory consistency models in the continuum between weak consistency models and strong consistency models, cache coherency requires, at a minimum, that after a processing unit accesses a copy of a memory block and subsequently accesses an updated copy of the memory block, the processing unit cannot again access the old ("stale") copy of the memory block.

A cache coherence protocol typically defines a set of coherence states stored in association with cached copies of memory blocks, as well as the events triggering transitions between the coherence states and the coherence states to which transitions are made. Coherence protocols can generally be classified as directory-based or snoop-based protocols. In directory-based coherence protocols, a common central directory maintains coherence by controlling accesses to memory blocks by the caches and by updating or invalidating copies of the memory blocks held in the various caches. Snoop-based coherence protocols, on the other hand, implement a distributed design paradigm in which each cache maintains a private directory of its contents, monitors ("snoops") the system interconnect for memory access requests targeting memory blocks held in the cache, and responds to the memory access requests by updating its private directory, and if required, by transmitting coherence message(s) and/or its copy of the memory block.

The cache states of the coherence protocol can include, for example, those of the well-known MESI (Modified, Exclusive, Shared, Invalid) protocol or a variant thereof. The MESI protocol allows a cache line of data to be associated with one of four states: "M" (Modified), "E" (Exclusive), "S" (Shared), or "I" (Invalid). The Modified state indicates that a memory block is valid only in the cache holding the Modified memory block and that the memory block is not consistent with system memory. The Exclusive state indicates that the associated memory block is consistent with system memory and that the associated cache is the only cache in the data processing system that holds the associated memory block. The Shared state indicates that the associated memory block is resident in the associated cache and possibly one or more other caches and that all of the copies of the memory block are consistent with system memory. Finally, the Invalid state indicates that the data and address tag associated with a coherency granule are both invalid.

In snoop-based coherence protocols, it is common for caches to respond to a request snooped on the interconnect by providing an individual coherence response. These individual coherence responses are then combined or otherwise processed to determine a final systemwide coherence response for the request, which can indicate, for example, whether or not the request will be permitted to succeed or will have to be retried, a data source responsible for supplying to the requesting cache a target cache line of data identified in the request, a coherence state of the target cache line at one or more caches following the request, etc. In a conventional data processing system employing a snoop-based coherence protocol, the minimum handoff interval at which a cache line of data can be sourced (intervened) from a cache in a vertical cache hierarchy supporting one processor core to another cache in a different vertical cache hierarchy supporting another processor core via the system interconnect is the time between when a request is issued by a cache and the systemwide coherence response is received by that cache.

BRIEF SUMMARY

According to one embodiment, the minimum handoff interval at which a cache line of data can be sourced from a cache in one vertical cache hierarchy to a cache in another vertical cache hierarchy via the system interconnect is reduced.

In at least one embodiment, a multiprocessor data processing system includes multiple vertical cache hierarchies supporting a plurality of processor cores, a system memory, and a system interconnect. In response to a load-and-reserve request from a first processor core, a first cache memory supporting the first processor core issues on the system interconnect a memory access request for a target cache line of the load-and-reserve request. Responsive to the memory access request and prior to receiving a systemwide coherence response for the memory access request, the first cache memory receives from a second cache memory in a second vertical cache hierarchy by cache-to-cache intervention the target cache line and an early indication of the systemwide coherence response for the memory access request. In response to the early indication and prior to receiving the systemwide coherence response, the first cache memory initiating processing to update the target cache line in the first cache memory.

DETAILED DESCRIPTION

Figure 1:
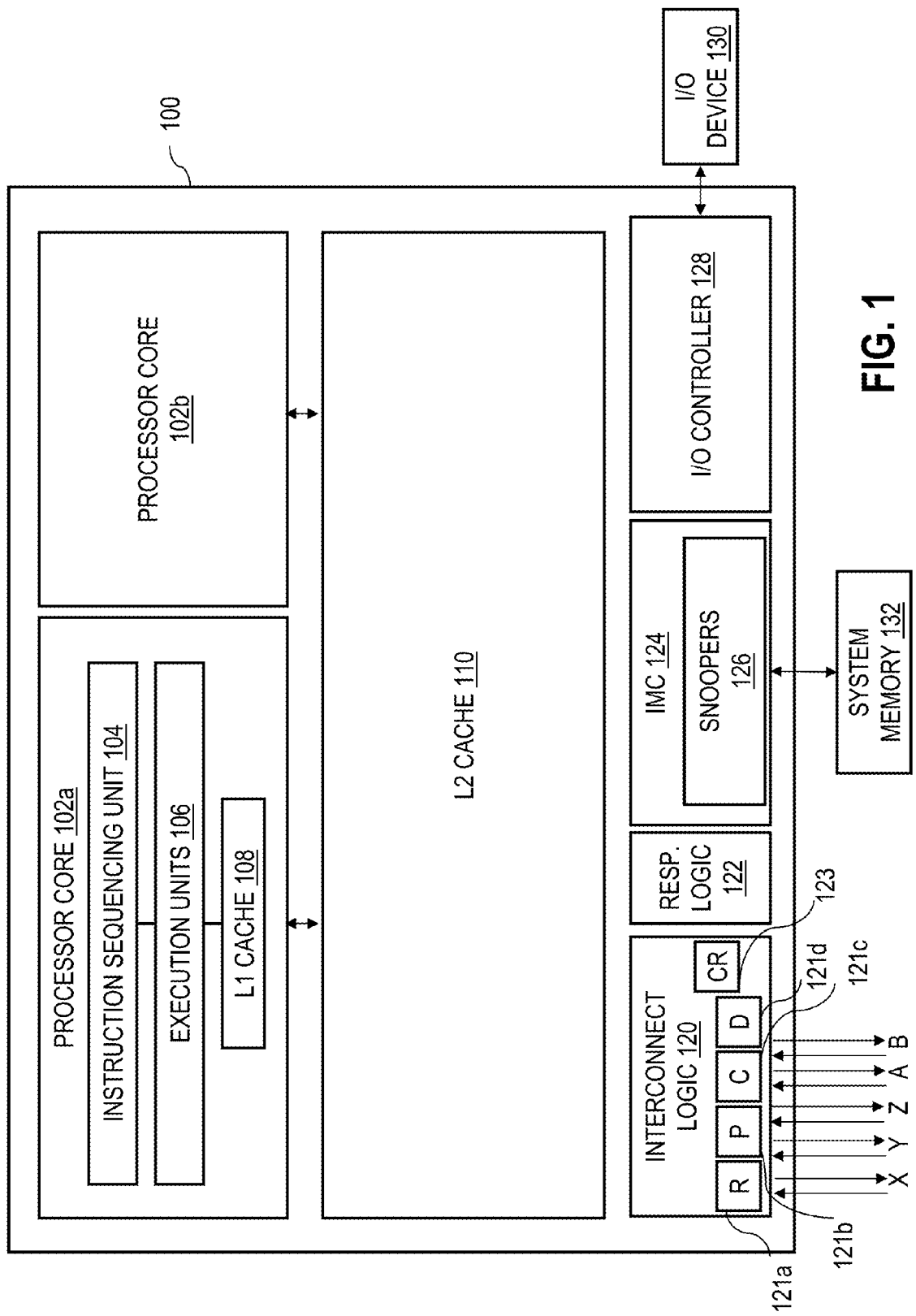
FIG. 1 is a diagram of a relevant portion of a processing unit in accordance with one embodiment.

With reference now to the figures and, in particular, with reference to FIG. 1, there is illustrated a high level block diagram of an exemplary embodiment of a processing unit 100 of a multiprocessor data processing system in accordance with one embodiment. In the depicted embodiment, processing unit 100 is a single integrated circuit including two processor cores 102a, 102b for independently processing instructions and data. (Of course, in other embodiments, the number of processor cores 102 may vary.) Each processor core 102 includes an instruction sequencing unit (ISU) 104 for fetching and ordering instructions for execution and one or more execution units 106 for executing instructions. For example, execution units 106 may include one or more floating-point units (FPUs), one or more load-store units (LSUs), and one or more integer units (IUs). The instructions executed by execution units 106 may include, for example, fixed and floating point arithmetic instructions, logical instructions, and instructions that request read and/or write access to a memory block.

The operation of each processor core 102a, 102b is supported by a multi-level memory hierarchy having at its lowest level one or more shared system memories 132 (only one of which is shown in FIG. 1) and, at its upper levels, a vertical cache memory hierarchy including one or more levels of cache memory. As depicted, processing unit 100 includes an integrated memory controller (IMC) 124 that controls read and write access to a system memory 132 in response to operations snooped on an interconnect fabric (described below) by snoopers 126.

In the illustrative embodiment, the vertical cache memory hierarchy of processing unit 100 includes a store-through level one (L1) cache 108 within each processor core 102a, 102b and a level two (L2) cache 110 shared by all processor cores 102a, 102b of the processing unit 100. (In other embodiments, each processor core 102 may have its own private L2 cache 110.) Although the illustrated cache hierarchy includes only two levels of cache memory, those skilled in the art will appreciate that alternative embodiments may include additional levels (e.g., level three (L3), level four (L4), etc.) of on-chip or off-chip in-line or look-aside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric of a larger multiprocessor data processing system. In the depicted embodiment, interconnect logic 120 supports an arbitrary number t1 of "first tier" interconnect links, which in this case include in-bound and out-bound 'X', 'Y' and 'Z' links. Interconnect logic 120 further supports an arbitrary number t2 of second tier links, designated in FIG. 1 as in-bound and out-bound 'A' and 'B' links. With these first and second tier links, each processing unit 100 may be coupled for bi-directional communication to up to t1/2+t2/2 (in this case, five) other processing units 100. Interconnect logic 120 includes request logic (labeled 'R') 121a, partial response logic (labeled 'P') 121b, combined response logic (labeled 'C') 121c and data logic (labeled 'D') 121d for processing and forwarding information during different phases of operations on the interconnect. In addition, interconnect logic 120 includes a configuration register (labeled 'CR')

123 including a plurality of mode bits utilized to configure processing unit 100. These mode bits preferably include: (1) a first set of one or more mode bits that selects a desired link information allocation for the first and second tier links; (2) a second set of mode bits that specify which of the first and second tier links of the processing unit 100 are connected to other processing units 100; and (3) a third set of mode bits that determines a programmable duration of a protection window extension.

Each processing unit 100 further includes an instance of response logic 122, which implements a portion of a distributed snoop-based coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the 'X', 'Y', 'Z', 'A', and 'B' links in response to requests by I/O device 130.

Figure 2:
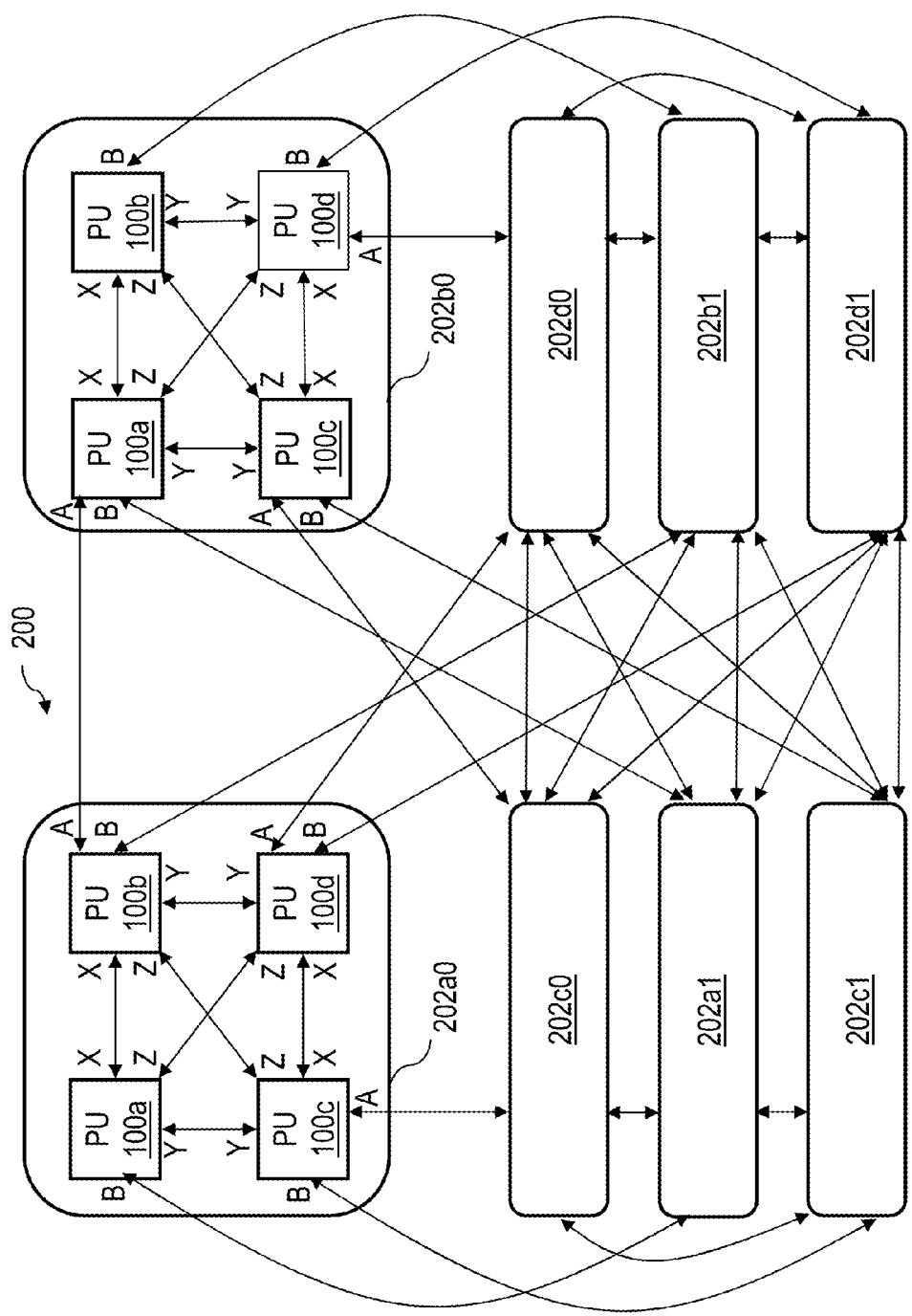
FIG. 2 is a diagram of a relevant portion of an exemplary data processing system in accordance with one embodiment.

Referring now to FIG. 2, there is depicted a block diagram of an exemplary embodiment of a data processing system 200 including multiple processing units 100 in accordance with the present invention. As shown, data processing system 200 includes eight processing nodes 202a0-202d0 and 202a1-202d1, which may each be realized as a multi-chip module (MCM) comprising a package containing four processing units 100. The processing units 100 within each processing node 202 are coupled for point-to-point communication by the processing units' 'X', 'Y', and 'Z' links, as shown. Each processing unit 100 may be further coupled to processing units 100 in two different processing nodes 202 for point-to-point communication by the processing units' 'A' and 'B' links. Although illustrated in FIG. 2 with a double-headed arrow, it should be understood that each pair of 'X', 'Y', 'Z', 'A', and 'B' links are preferably (but not necessarily) implemented as two uni-directional links, rather than as a bi-directional link.

General expressions for forming the topology shown in FIG. 2 can be given as follows:

Node[I][K].chip[J].link[K] connects to Node[J][K].chip [I].link[K], for all I≠J; and Node[I][K].chip[I].link[K] connects to Node[I][not K].chip[I].link[not K]; and Node[I][K].chip[I].link[not K] connects either to:
(1) Nothing (is reserved for future expansion); or
(2) Node[extra][not K].chip[I].link[K], in case in which all links are fully utilized (i.e., nine 8-way nodes forming a 72-way system); and
where I and J belong to the set {a, b, c, d} and K belongs to the set {0,1}.

Of course, alternative expressions can be defined to form other functionally equivalent topologies. Moreover, it should be appreciated that the depicted topology is representative but not exhaustive of data processing system topologies in which the present invention is implemented and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J).

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

Figure 3:
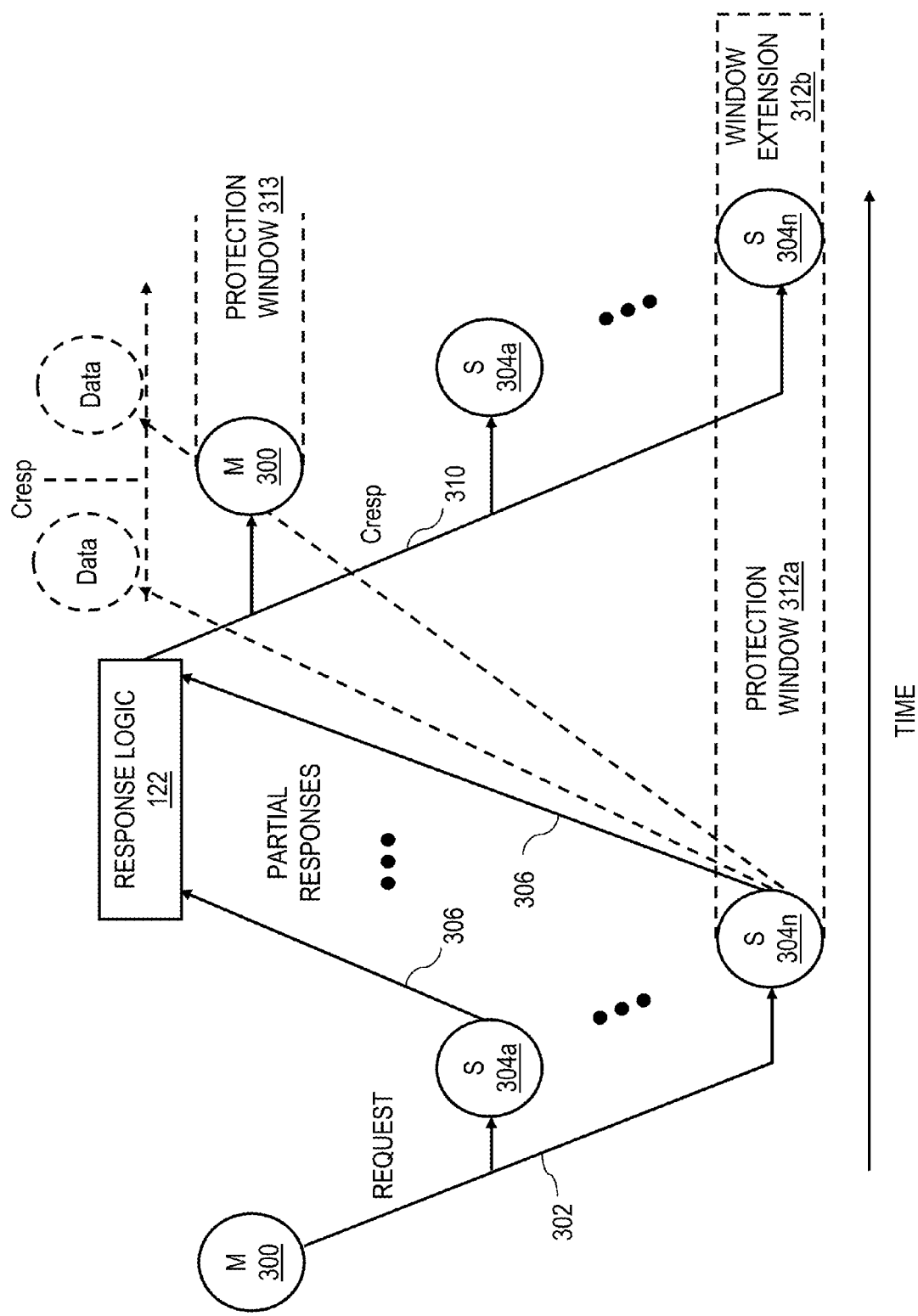
FIG. 3 is a time-space diagram of an exemplary operation including a request phase, a partial response (Presp) phase, and a combined response (Cresp) phase implemented within the data processing system of FIG. 2.

Referring now to FIG. 3, there is depicted a time-space diagram of an exemplary interconnect operation on the interconnect fabric of data processing system 200 of FIG. 2. The interconnect operation begins when a master 300 (e.g., a read-claim (RC) machine 512 of an L2 cache 110 (see, e.g., FIG. 5) or a master within an I/O controller 128) issues a request 302 on the interconnect fabric. Request 302 preferably includes at least a transaction type indicating a type of desired access and a resource identifier (e.g., target real address) indicating a resource to be accessed by the request. Common types of requests include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Further details regarding these operations and an exemplary cache coherency protocol that facilitates efficient handling of these operations may be found in U.S. Pat. No. 7,774,555, which is incorporated herein by reference in its entirety for all purposes.

Request 302 is received by snoopers 304 (e.g., snoop machines 511 of L2 caches 110 (see, e.g., FIG. 5) and snoopers 126 of IMCs 124) distributed throughout data processing system 200. In general, with some exceptions, snoopers 304 in the same L2 cache 110 as the master 300 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response (Presp) 306 representing the response of at least that snooper 304 to request 302. A snooper 126 within an IMC 124 determines the partial response 306 to provide based, for example, upon whether the snooper 126 is responsible for the request address and whether it has resources available to service the request. An L2 cache 110 may determine its partial response 306 based on, for example, the availability of a snoop machine 511 to handle the request, the availability of its L2 cache directory 508 (see, e.g., FIG. 5), and the coherency state associated with the target real address in L2 cache directory 508.

The partial responses 306 of snoopers 304 are logically combined either in stages or all at once by one or more instances of response logic 122 to determine a system-wide combined response (Cresp) 310 to request 302. In one embodiment, which is assumed hereinafter, the instance of response logic 122 responsible for generating Cresp 310 is located in the processing unit 100 containing the master 300 that issued request 302. Response logic 122 provides Cresp 310 to master 300 and snoopers 304 via the interconnect fabric to indicate the system-wide coherence response (e.g., success, failure, retry, etc.) to request 302. If Cresp 310 indicates success of request 302, Cresp 310 may indicate, for example, a data source for a target memory block of request 302, a coherence state in which the requested memory block is to be cached by master 300 (or other caches), and whether "cleanup" operations invalidating the requested memory block in one or more caches are required.

In response to receipt of Cresp 310, one or more of master 300 and snoopers 304 typically perform one or more additional actions in order to service request 302. These additional actions may include supplying data to master 300, invalidating or otherwise updating the coherence state of data cached in one or more L2 caches 110, performing castout operations, writing back data to a system memory 132, etc. If required by request 302, a requested or target memory block may be transmitted to or from master 300 before or after the generation of Cresp 310 by response logic 122.

In the following description, the partial response 306 of a snooper 304 to a request 302 and the actions performed by the snooper 304 in response to the request 302 and/or its combined response 310 will be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the cache directory of an L2 cache 110.

Still referring to FIG. 3, the HPC, if any, for a memory block referenced in a request 302, or in the absence of an HPC, the LPC of the memory block, preferably has the responsibility of protecting the transfer of coherence ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of coherence ownership of the requested (target) memory block to master 300 during a protection window 312a that extends from the time that snooper 304n determines its partial response 306 until snooper 304n receives Cresp 310 and during a subsequent window extension 312b extending a programmable time beyond receipt by snooper 304n of Cresp 310. During protection window 312a and window extension 312b, snooper 304n protects the transfer of coherence ownership of the target memory block from snooper 304n to mater 300 by providing partial responses 306 (e.g., retry partial responses) to other requests specifying the same request address. Such partial responses 306 prevent other masters from obtaining coherence ownership of the target memory block until coherence ownership has been successfully transferred from snooper 304n to master 300. If necessary, following receipt of combined response 310, master 300 may likewise initiate a protection window 313 to protect its acquisition of coherence ownership of the target memory block. Protection window 313 ensures that any master subsequently requesting the target memory block will receive any new value of the target memory block created by master 300 rather than a stale value.

Because snoopers 304 all have limited resources for handling the CPU and I/O requests described above, several different levels of partial responses and corresponding Cresps are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that it is the LPC for the memory block, but is unable to currently service the request. Similarly, an L2 cache 110 may require an available snoop machine 511 and access to L2 cache directory 508 in order to handle a request. Absence of access to either (or both) of these resources results in a partial response (and corresponding Cresp) signaling an inability to service the request due to absence of a required resource.

As is further illustrated in FIG. 3, snooper 304n may return data (e.g., for a READ or RWITM request) to master 300 (e.g., an L2 cache 110) before or after master 300 receives the Cresp (for the READ or RWITM request) from response logic 122.

Figure 4:
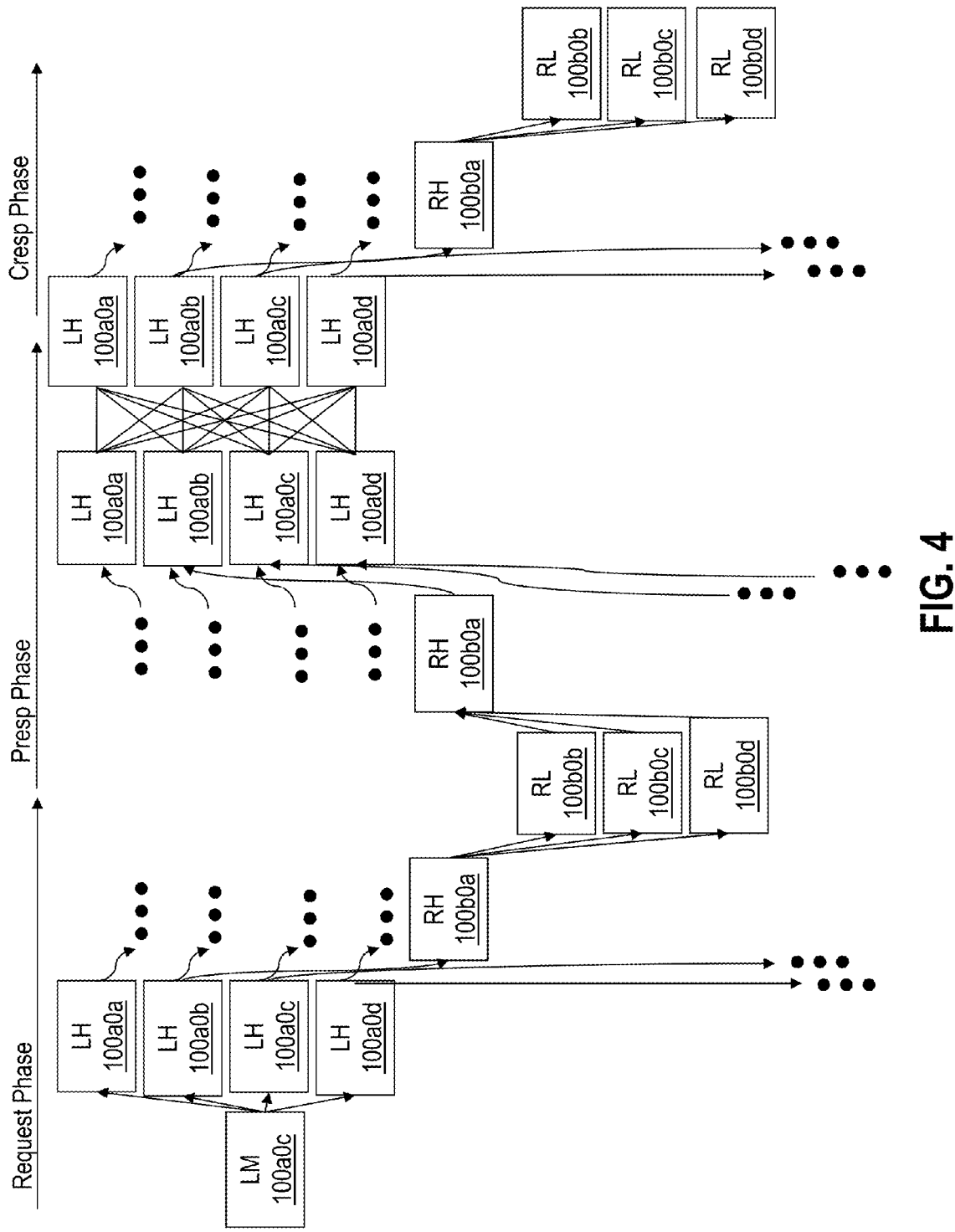
FIG. 4 is a time-space diagram of an exemplary operation within the data processing system of FIG. 2.

Referring now to FIG. 4, there is illustrated a time-space diagram of an exemplary operation flow in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Still referring to FIG. 4, the request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. This internal transmission may be advantageously employed to synchronize the operation of local hub 100a0c with local hubs 100a0a, 100a0b and 100a0d so that the timing constraints can be more easily satisfied.

In response to receiving the request, each local hub 100 that is coupled to a remote hub 100 by its 'A' or 'B' links transmits the operation to its remote hub(s) 100. Thus, local hub 100a0a makes no transmission of the operation on its outbound 'A' link, but transmits the operation via its outbound 'B' link to a remote hub within processing node 202a1. Local hubs 100a0b, 100a0c and 100a0d transmit the operation via their respective outbound 'A' and 'B' links to remote hubs in processing nodes 202b0 and 202b1, processing nodes 202c0 and 202c1, and processing nodes 202d0 and 202d1, respectively. Each remote hub 100 receiving the operation, in turn, transmits the operation to each remote leaf 100 in its processing node 202. Thus, for example, remote hub 100b0a transmits the operation to remote leaves 100b0b, 100b0c and 100b0d. In this manner, the operation is efficiently broadcast to all processing units 100 within data processing system 200 utilizing transmission over no more than three links.

Following the request phase, the partial response (Presp) phase occurs. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. It should be noted that the broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

As further shown in FIG. 4, response logic 122 at each local hub 100 within processing node 202a0 compiles the partial responses of the other processing units 100 to obtain a combined response representing the system-wide coherence response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, local hub 100a0b transmits the combined response to remote hub 100b0a, which in turn transmits the combined response to remote leaves 100b0b, 100b0c and 100b0d.

As noted above, servicing the operation may require an additional data phase. For example, if the operation is a read-type operation, such as a READ or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b.

Of course, the scenario depicted in FIG. 4 is merely exemplary of the myriad of possible operations that may occur concurrently in a multiprocessor data processing system such as data processing system 200.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, protection window 312a and window extension 312b must together be of sufficient duration to protect the transfer of coherency ownership of the requested memory block to a winning master (WM) 300 in the presence of a competing request by a competing master (CM). To ensure that protection window 312a and window extension 312b have sufficient duration to protect the transfer of ownership of the requested memory block to winning master 300, the latency of communication between processing units 100 in accordance with FIG. 4 is preferably constrained such that the following conditions are met:

$$A\_lat(CM\_S) \le A\_lat(CM\_WM) + C\_lat(WM\_S) + \varepsilon,$$

where A_lat(CM_S) is the address latency of any competing master (CM) to the snooper (S) 304n owning coherence of the requested memory block, A_lat(CM_WM) is the address latency of any competing master (CM) to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and ε is the duration of window extension 312b.

If the foregoing timing constraint, which is applicable to a system of arbitrary topology, is not satisfied, the request of the competing master may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to the competing request that prevents the competing master from assuming coherency ownership of the memory block and reading non-coherent data from memory. However, to avoid this coherency error, window extension 312b can be programmably set (e.g., by appropriate setting of configuration register (CR) 123) to an arbitrary length (ε) to compensate for latency variations or the shortcomings of a physical implementation that may otherwise fail to satisfy the timing constraint that must be satisfied to maintain coherency. Thus, by solving the above equation for ε, the ideal length of window extension 312b for any implementation can be determined.

Several observations may be made regarding the foregoing timing constraint. First, the address latency from the competing master to the owning snooper 304a has no necessary lower bound, but must have an upper bound. The upper bound is designed for by determining the worst case latency attainable, given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration. Although for a given operation, each of the winning master 300 and competing master has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304n has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master to winning master 300 have no necessary upper or lower bounds.

The first tier and second tier links connecting processing units 100 may be implemented in a variety of ways to obtain the topology depicted in FIG. 2 and to meet timing constraints. In one preferred embodiment, each inbound and outbound first tier ('X', 'Y', and 'Z') link and each inbound and outbound second tier ('A' and 'B') link is implemented as a uni-directional 8-byte bus containing a number of different virtual channels or tenures to convey address, data, control and coherency information.

Figure 5:
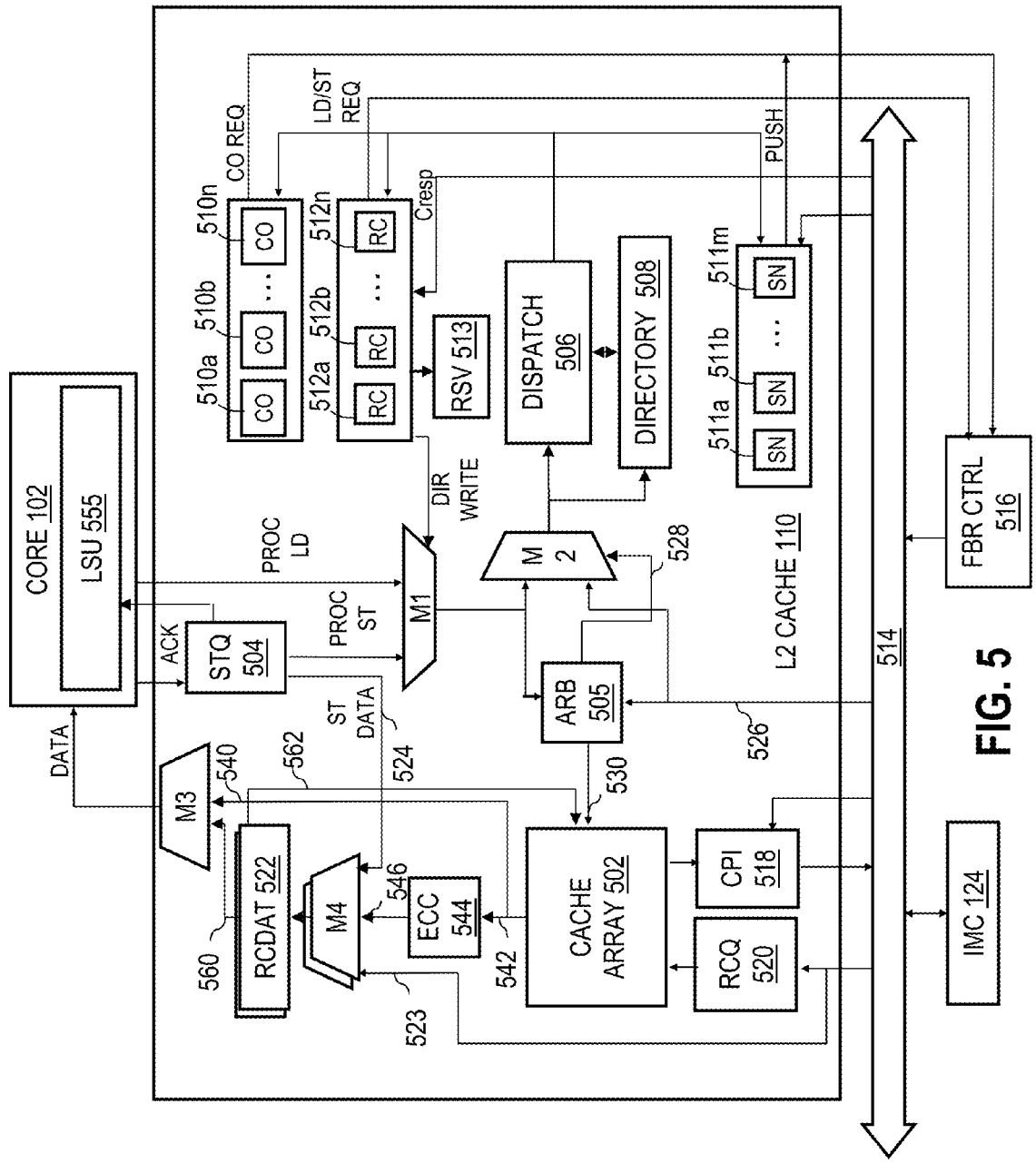
FIG. 5 is a more detailed block diagram of an L2 cache of FIG. 1 in accordance with one embodiment.

With reference now to FIG. 5, there is illustrated a more detailed block diagram of an exemplary L2 cache 110 in accordance with one embodiment. As shown in FIG. 5, L2 cache 110 includes a cache array 502 and a directory 508 of the contents of cache array 502. Although not explicitly illustrated, cache array 502 preferably is implemented with a single read port and a single write port to reduce the die area required to implement cache array 502.

Assuming cache array 502 and directory 508 are set-associative as is conventional, memory locations in system memory 132 are mapped to particular congruence classes within cache array 502 utilizing predetermined index bits within the system memory (real) addresses. The particular memory blocks stored within the cache lines of cache array 502 are recorded in cache directory 508, which contains one directory entry for each cache line. While not expressly depicted in FIG. 5, it will be understood by those skilled in the art that each directory entry in cache directory 508 includes various fields, for example, a tag field that identifies the real address of the memory block held in the corresponding cache line of cache array 502, a state field that indicate the coherence state of the cache line, and a least recently used (LRU) field indicating a replacement order for the cache line with respect to other cache lines in the same congruence class.

L2 cache 110 includes multiple (e.g., 16 or 32) read-claim (RC) machines 512a-512n for independently and concurrently servicing load (LD) and store (ST) requests received from the affiliated processor core 102. In addition, L2 cache 110 includes multiple (e.g., 16 or 32) snoop machines 511a-511m to service remote memory access requests originating from processor cores 102 other than the affiliated processor core 102. Each snoop machine 511 can independently and concurrently handle a remote memory access request "snooped" from local interconnect 514. As will be appreciated, the servicing of memory access requests by L2 cache 110 may require the replacement or invalidation of memory blocks within cache array 502. Accordingly, L2 cache 110 includes CO (castout) machines 510a-510n that manage the removal and writeback of memory blocks from cache array 502.

L2 cache 110 also includes an RC queue 520 and a CPI (castout push intervention) queue 518 that respectively buffer data being inserted into and removed from the cache array 502. RC queue 520 includes a number of buffer entries that each individually correspond to a particular one of RC machines 512 such that each RC machine 512 that is dispatched retrieves data from only the designated buffer entry. Similarly, CPI queue 518 includes a number of buffer entries that each individually correspond to a particular one of the castout machines 510 and snoop machines 511, such that each CO machine 510 and each snooper 511 that is dispatched retrieves data from only the respective designated CPI buffer entry.

Each RC machine 512 also has assigned to it a respective one of multiple RC data (RCDAT) buffers 522 for buffering a memory block read from cache array 502 and/or received from local interconnect 514 via reload bus 523. The RCDAT buffer 522 assigned to each RC machine 512 is preferably constructed with connections and functionality corresponding to the memory access requests that may be serviced by the associated RC machine 512. At least some of RCDAT buffers 522 have an associated store data multiplexer M4 that selects data bytes from among its inputs for buffering in the RCDAT buffer 522 in response unillustrated select signals generated by arbiter 505.

L2 cache 110 additionally includes an arbiter 505 configured to control multiplexers M1-M2 to order the processing of local memory access requests received from the affiliated processor core 102 and remote requests snooped on local interconnect 514. Memory access requests, including local load and store operations and remote read and write operations, are forwarded in accordance with the arbitration policy implemented by arbiter 505 to a dispatch pipeline 506 where each read/load and store request is processed with respect to directory 508 and cache array 502 over a given number of cycles.

L2 cache 110 additionally provides support for atomic updates by the associated processor core(s) 102 through the implementation of reservation logic 513, which tracks reservations established by atomic load (e.g., load-and-reserve (LARX)) requests to ensure that corresponding atomic store (e.g., store-conditional (STCX)) requests only complete successfully if the reserved cache lines have not been modified since the reservations were established (i.e., if the relevant reservation is still valid). In a typical embodiment, reservation logic 513 includes, for each thread, a respective reservation address register that specifies the base address of a cache line for which a reservation is established and a reservation flag indicating whether or not the reservation for the specified cache line is still valid.

In operation, processor store requests comprising a transaction type (ttype), target real address, and store data are received from the affiliated processor core 102 within a store queue (STQ) 504. From STQ 504, the store data are transmitted to store data multiplexer M4 via data path 524, and the store type and target address are passed to multiplexer M1. Multiplexer M1 also receives as inputs processor load requests from processor core 102 and directory write requests from RC machines 512. In response to unillustrated select signals generated by arbiter 505, multiplexer M1 selects one of its input requests to forward to multiplexer M2, which additionally receives as an input a remote request received from local interconnect 514 via remote request path 526. Arbiter 505 schedules local and remote memory access requests for processing and, based upon the scheduling, generates a sequence of select signals 528. In response to select signals 528 generated by arbiter 505, multiplexer M2 selects either the local request received from multiplexer M1 or the remote request snooped from local interconnect 514 as the next memory access request to be processed.

A request selected for processing by arbiter 505 is placed by multiplexer M2 into dispatch pipeline 506. Dispatch pipeline 506 preferably is implemented as a fixed duration pipeline in which each of multiple possible overlapping requests A, B, C, etc. is processed for a predetermined number of clock cycles. For example, dispatch pipeline 506 may process each request for four cycles.

During a first cycle of processing within dispatch pipeline 506, a 1-cycle directory read is performed utilizing the request address to determine if the request address hits or misses in directory 508, and if the memory address hits, the coherence state of the memory block within directory 508. The directory information, which includes a hit/miss indication and the coherence state of the memory block, is returned by directory 508 to dispatch pipeline 506 in a subsequent cycle, such as the fourth cycle. As will be appreciated, no action is generally taken within an L2 cache 110 in response to miss on a remote memory access request; such remote memory requests are accordingly discarded from dispatch pipeline 506. However, in the event of a hit or miss on a local memory access request or a hit on a remote memory access request, L2 cache 110 will service the memory access request, which for requests that cannot be serviced entirely within processing unit 100, may entail communication on local interconnect 514 via fabric controller 516.

At a predetermined time during processing of the memory access request within dispatch pipeline 506, arbiter 505 transmits the request address to cache array 502 via address and control path 530 to initiate a cache read of the memory block specified by the request address. A cache read takes 2 cycles in the exemplary embodiment. The memory block read from cache array 502 is transmitted via data path 542 to error correcting code (ECC) logic 544, which checks the memory block for errors and, if possible, corrects any detected errors. For processor load requests, the memory block is also transmitted to load data multiplexer M3 via data path 540 for forwarding to the affiliated processor core 102.

At the last cycle of the processing of a memory access request within dispatch pipeline 506, dispatch pipeline 506 make a dispatch determination. For example, dispatch pipeline 506 may make the dispatch determination based upon a number of criteria, including (1) the presence of an address collision between the request address and a previous request address currently being processed by a castout machine 510, snoop machine 511 or RC machine 512, (2) the directory information, and (3) availability of an RC machine 512 (for a local request of the affiliated processor core 102) or snoop machine 511 (for a snooped request of a remote processor core) to process the memory access request. If dispatch pipeline 506 makes a dispatch determination that the memory access request is to be dispatched, the memory access request is dispatched from dispatch pipeline 506 to an RC machine 512 or a snoop machine 511, as appropriate. If the memory access request fails dispatch, the failure is signaled to the requestor (e.g., local or remote processor core 102) by a retry response. The requestor may subsequently retry the failed memory access request, if necessary.

While an RC machine 512 is processing a local memory access request, the RC machine 512 has a busy status and is not available to service another request. While an RC machine 512 has a busy status, the RC machine 512 may perform a directory write to update the relevant entry of directory 508, if necessary. In addition, the RC machine 512 may perform a cache write to update the relevant cache line of cache array 502. A directory write and a cache write may be scheduled by arbiter 505 during any interval in which dispatch pipeline 506 is not already processing other requests according to the fixed scheduling of directory reads and cache reads. When all operations for the given request have been completed, the RC machine 512 returns to an unbusy state.

It will be appreciated that the scheduling of non-fixed-schedule operations such as directory writes and cache writes can impact the scheduling of other operations, including those processed according to a fixed schedule.

Figure 6:
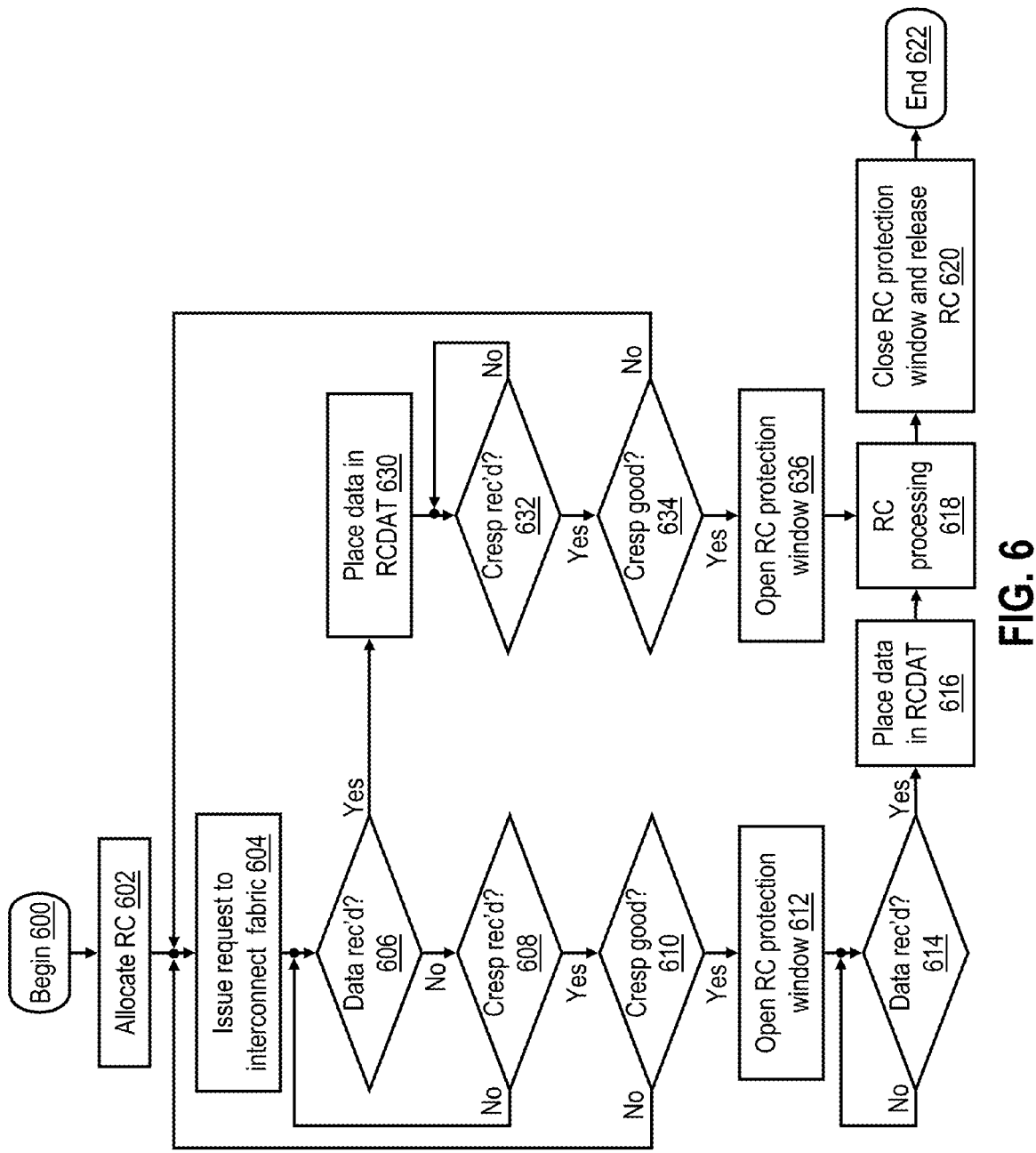
FIG. 6 is a flowchart of a conventional process by which a read-claim (RC) machine of a lower level cache services a memory access request of an affiliated processor core via an interconnect operation.

With reference now to FIG. 6, there is depicted a high level logical flowchart of a conventional process by which an RC machine 512 of an L2 cache 110 services a memory access request of an affiliated processor core 102 via an interconnect operation. To promote better understanding, additional reference is made to FIG. 7, which is a timing diagram showing a particular operating scenario in which, prior to receiving the combined response for the request of the interconnect operation, the L2 cache 110 receives, by cache-to-cache intervention, a target cache line specified by the request.

The process of FIG. 6 begins at block 600 in response to receipt of a memory access request of a processor core 102 in the dispatch pipeline 506 of its associated L2 cache 110. The process then proceeds to block 602, which illustrates dispatch pipeline 506 allocating an unbusy RC machine 512 to service the request. In response to allocation of the RC machine 512 to service the memory access request, the RC machine 512 transitions to a busy state (the busy state of RC machine 512 is shown at reference numeral 700 of FIG. 7).

Assuming that the coherence state returned by the directory 508 of the master L2 cache 110 indicates that the memory access request cannot be serviced without RC machine 512 retrieving a copy of the target cache line (e.g., as would be the case if a cache miss occurred), the RC machine 512 allocated at block 602 initiates an interconnect operation by issuing an appropriate request for the target cache line (e.g., READ or RWITM) on the interconnect fabric (block 604).

Figure 7:
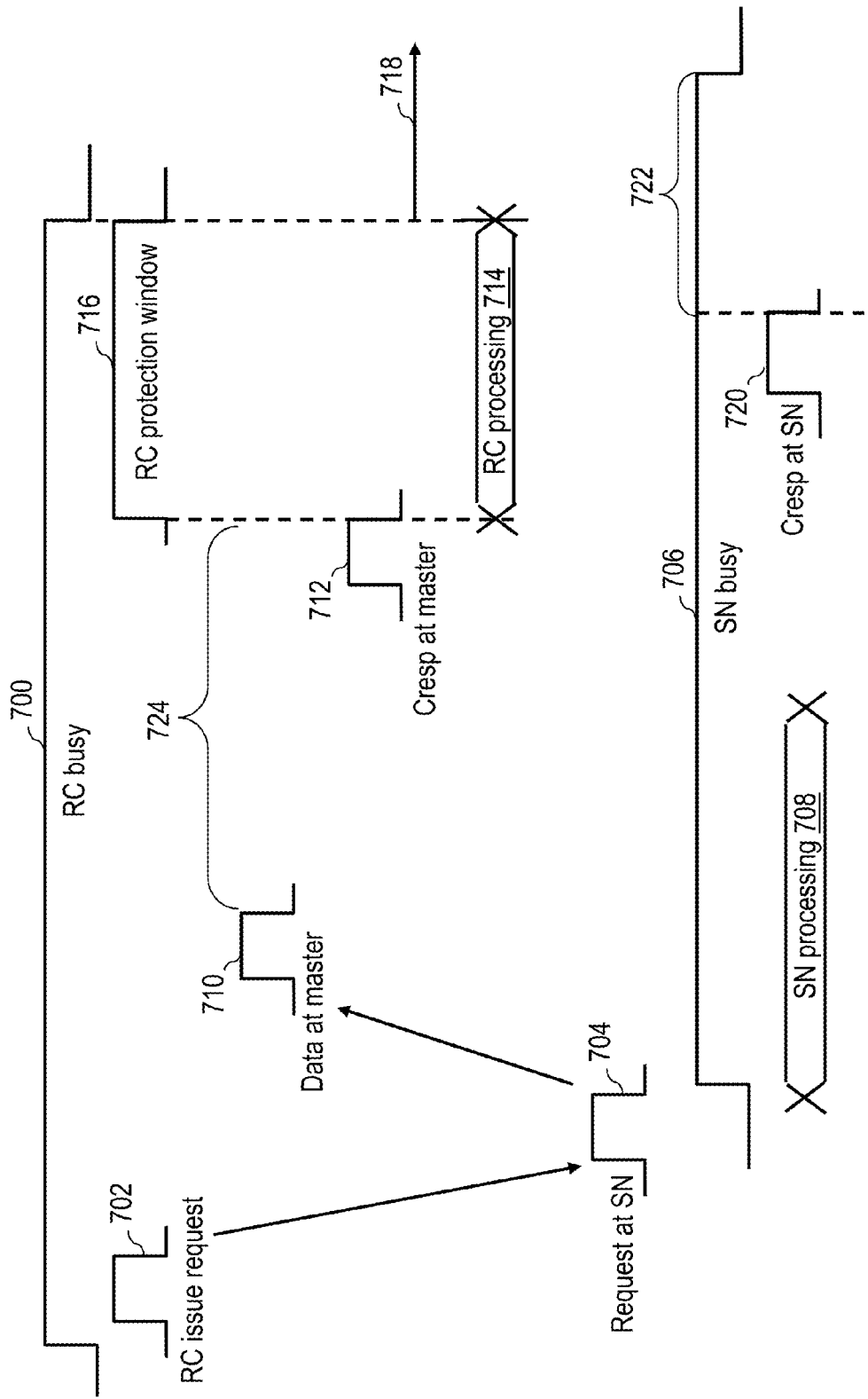
FIG. 7 is a timing diagram of a conventional interconnect operation in which, prior to receiving the combined response for the request of the interconnect operation, the lower level cache receives, by cache-to-cache intervention, a target cache line specified by the request.

Issuance of the request on the interconnect fabric is illustrated at reference numeral 702 of FIG. 7. Depending on the implemented interconnect topology, the request may be (and likely will be) received by snoopers distributed throughout data processing system 200 at various different times. The receipt of the request by one of the snoopers that will serve as the data source for the target cache line is specifically indicated in FIG. 7 at reference numeral 704. In response to receipt of the request, the snooper (in this example, a snoop machine 511 of an L2 cache 110 that is the HPC) assumes a busy state (the busy state of the snooper is depicted at reference numeral 706). While the snooper is in the busy state, the snooper performs any processing required to service the request, as indicated at reference numeral 708. In the present case, this processing includes providing the target cache line specified by the request to the master L2 cache 110 by cache-to-cache intervention in advance of receipt by the snooper of the combined response 720. Following receipt of the combined response 720, the snooper remains in a busy state (and thus protects acquisition of coherence ownership of the target cache line by the master) for the duration of the window extension 312b as shown at reference numeral 722.

Returning to FIG. 6, following issuance of the request at block 604, the master L2 cache 110 concurrently monitors for both return of the requested data (e.g., from the snooping L2 cache 110 that is the HPC) and receipt of the combined response (Cresp) of the operation (blocks 606-608). In response to L2 cache 110 determining at block 608 that the combined response has been received prior to the requested data, the process of FIG. 6 proceeds to block 610 and following blocks. For clarity, this timing scenario is not explicitly illustrated in FIG. 7. However, in response to L2 cache 110 determining at block 606 that the requested data has been received prior to the combined response of the operation, the process proceeds to block 630 and following blocks, which are described below with additional reference to FIG. 7.

Referring first to block 610 and following blocks, RC machine 512 determines whether or not the combined response received for the read operation at block 608 is "good," meaning that the combined response indicates that the requested target cache line of data will be supplied to the requesting L2 cache 110 (block 610). In response to a determination at block 610 that the combined response is not a "good" combined response, the process returns to block 604, indicating that RC machine 512 will re-issue the request on the interconnect fabric. However, in response to RC machine 512 determining at block 610 that the combined response is "good", the process passes from block 610 to block 612.

Block 612 illustrates RC machine 512 opening a protection window 313, if necessary to protect transfer of coherence ownership of the target cache line from the snooper to the requesting L2 cache 110. The process then iterates at block 614 until the target cache line of data is received in the buffer in RCQ 520 corresponding to the RC machine 512. In response to receipt of the target cache line of data in the RCQ 520, L2 cache 110 places the requested data in the RCDAT buffer 522 corresponding to the RC machine 512 (block 616). In addition, at block 618, RC machine 512 performs additional processing to service the memory access request of the affiliated processor core 102, for example, by initiating transfer of the requested data from RCDAT 522 to the affiliated processor core 102, by issuing to dispatch pipeline 506 a cache write request requesting transfer of the target cache line from the buffer in RCQ 520 to cache array 502 and/or a directory write request requesting an update the coherence state of the target cache line indicated by directory 508. At the conclusion of the processing performed by RC machine 512, the RC protection window 313 closes (ends), and the RC machine 512 is released, thereby returning the RC machine to an unbusy state (block 620). Thereafter, the process of FIG. 6 terminates at block 622 until RC machine 512 is allocated to service another memory access request.

Still referring to FIG. 6, the processing performed in response to receipt by an L2 cache 110 of requested data prior to the combined response is now described with reference to block 630 and following blocks. In response to receipt of the target cache line in the RCQ 520 (as shown at reference numeral 710 of FIG. 7), L2 cache 110 places the requested data in the RCDAT buffer 522 corresponding to the RC machine 512 (block 630). RC machine 512 then monitors for receipt of the combined response (see, e.g., Cresp 712 of FIG. 7) for the request, as shown at block 632. As indicated in FIG. 7, in some interconnect topologies and/or operating scenarios, the interval between issuance of the request and receipt of the combined response can be significantly longer (e.g., three times longer) than the interval between issuance of the request and receipt of the target cache line in the RCDAT buffer 522. The difference between the durations of these intervals, illustrated in FIG. 7 at reference numeral 724, represents a period in which the RC machine 512 servicing the memory access request performs no useful work.

When a determination is finally made at block 632 of FIG. 6 that the combined response of the request has been received (see, e.g., Cresp 712 of FIG. 7), RC machine 512 determines whether or not the combined response is a "good" combined response (block 634). In response to a determination at block 634 that the combined response is not a "good" combined response, the process of FIG. 6 returns to block 604 and following blocks, which have been described. However, in response to a determination at block 634 that the combined response is a "good" combined response, the process proceeds to block 636. Block 636 illustrates RC machine 512 opening a protection window 716, if necessary to protect transfer of coherence ownership of the target cache line to the requesting L2 cache 110. The process then proceeds to blocks 618-622, which have been described. As indicated in FIG. 7 at reference numeral 718, after RC protection window 716 closes and RC machine 512 is released (as shown in block 620), the master L2 cache 110 that received the target cache line is able to serve, if requested, as a data source for the target cache line in response to the request of a subsequent master.

As noted above, in a conventional multiprocessor data processing system, a master that requests a target cache line does not perform its processing for the target cache line until a combined response is received confirming its acquisition of coherence ownership of the target cache line. Such is the case even in operating scenarios in which the master receives the target cache line of data well in advance of the coherence message confirming acquisition of coherence ownership, resulting in a significant non-productive period 724 while a RC machine 512 is active servicing a memory access request. The present application recognizes, however, that this non-productive period can be reduced or eliminated (and hence the latency at which a given cache line can be acquired by successive masters can be reduced) in operating scenarios in which the systemwide coherence response to a master's request can be known at data delivery. The present application also recognizes that, while the systemwide coherence response cannot be determined a priori in all operating scenarios, it can be known in advance of receipt of combined response by a snooper that is an HPC holding a target cache line in a modified state (e.g., the MESI "M" state) because that snooper (which holds the single, unique copy of the target cache line) is responsible for granting or denying requests for the target cache line and hence is determinative of the combined response. Accordingly, in preferred embodiments of the present invention, an HPC snooper, when able to do so, provides an early indication of the combined response to a requesting master in conjunction with the target cache line.

Figure 8:
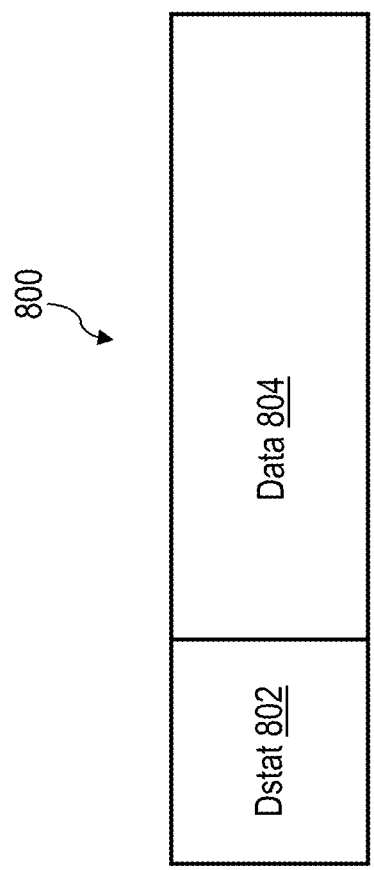
FIG. 8 illustrates an exemplary data tenure on the interconnect fabric of the data processing system of FIG. 2 that, in accordance with one embodiment, includes an early indication of the combined response of an interconnect operation.

Referring now to FIG. 8, there is depicted an exemplary data tenure 800 on the interconnect fabric of the data processing system of FIG. 2 in which a data status field can be utilized to communicate to a requesting master an early indication of the systemwide coherence response for a request. As shown, exemplary data tenure 800 includes at least two fields, namely, a data field 804 and a data status (Dstat) field 802, which can be communicated in one or more beats on the system interconnect. Data field 804 can communicate one or more cache lines of data (including a target cache line) from a snooper to a requesting master. The data status field 802 communicated in conjunction with data field 804 can be utilized by the snooper serving as the data source of the target cache line to provide, if possible, an early indication of whether or not the requesting master is assured of a "good" combined response to its request for the target cache line. In some embodiments, the indication may include an indication of a coherence state.

Figure 9:
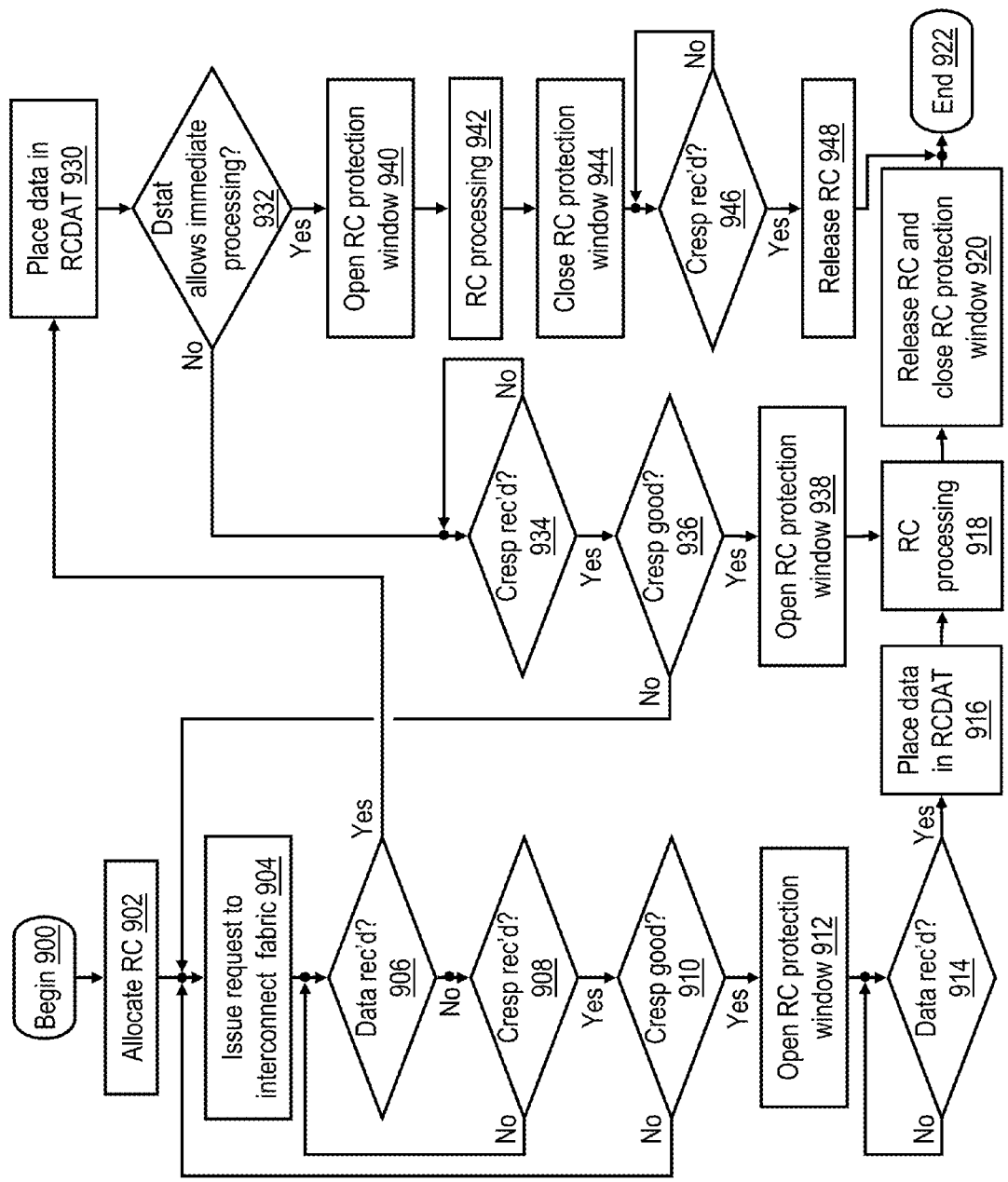
FIG. 9 is a high level logical flowchart of an exemplary process by which a read-claim (RC) machine of a lower level cache services a memory access request of an affiliated processor core via an interconnect operation.

With reference now to FIG. 9, there is illustrated a high level logical flowchart of an exemplary process by which a RC machine 512 of an L2 cache 110 services a memory access request of an affiliated processor core 102 via an interconnect operation. To promote better understanding, additional reference is made to FIG. 10, which is an exemplary timing diagram showing a particular operating scenario in which, prior to receiving the combined response for the request of the interconnect operation, the L2 cache 110 receives, by cache-to-cache intervention, a target cache line specified by the request.

The process of FIG. 9 begins at block 900 in response to receipt of a memory access request of a processor core 102 in the dispatch pipeline 506 of its associated L2 cache 110. The process then proceeds to block 902, which illustrates dispatch pipeline 506 allocating an unbusy RC machine 512 to service the request. In response to allocation of the RC machine 512 to service the memory access request, the RC machine 512 transitions to a busy state (the busy state of RC machine 512 as shown at reference numeral 1000 of FIG. 10).

Assuming that the coherence state returned by the directory 508 of the master L2 cache 110 indicates that the memory access request cannot be serviced without RC machine 512 retrieving a copy of the target cache line (e.g., as would be the case if a cache miss occurred), the RC machine 512 allocated at block 902 initiates an interconnect operation by issuing an appropriate request for the target cache line (e.g., READ or RWITM) on the interconnect fabric (block 904).

Figure 10:
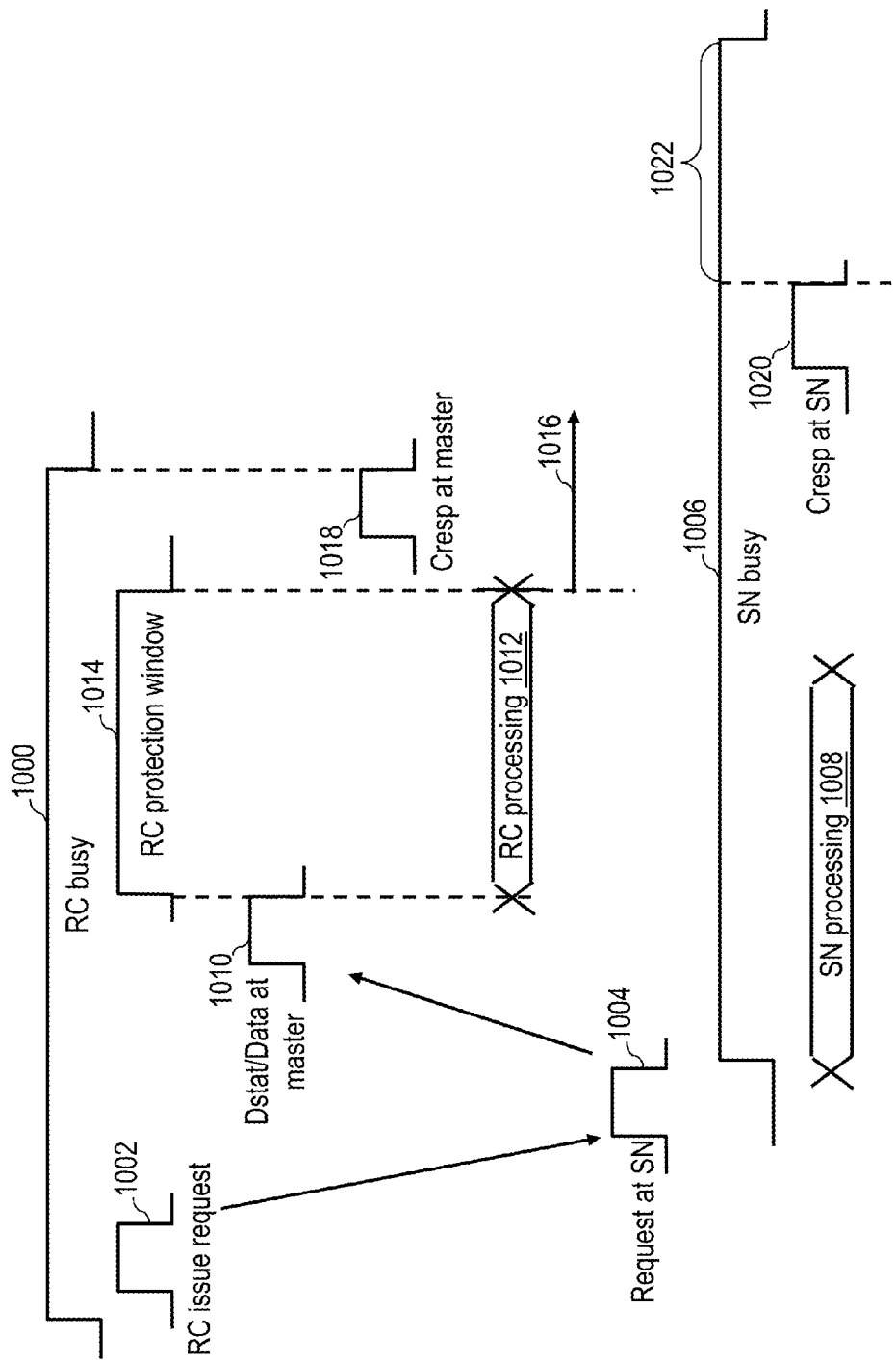
FIG. 10 is a timing diagram of an exemplary interconnect operation in which, prior to receiving the combined response for the request of the interconnect operation, the lower level cache receives, by cache-to-cache intervention, a target cache line specified by the request.

Issuance of the request on the interconnect fabric is illustrated at reference numeral 1002 of FIG. 10. Depending on the implemented interconnect topology, the request may be (and likely will be) received by snoopers distributed throughout data processing system 200 at various different times. The receipt of the request by one of the snoopers that will serve as the data source for the target cache line is specifically indicated in FIG. 10 at reference numeral 1004. In response to receipt of the request, the snooper (in this example, a snoop machine 511 of an L2 cache 110 that is able to resolve the systemwide coherence response in response to the request (e.g., an HPC L2 cache 110 in an appropriate coherence state)) assumes a busy state (as the snooper busy state is depicted at reference numeral 1006 of FIG. 10). While the snooper is in the busy state, the snooper performs any processing required to service the request, as indicated at reference numeral 1008. In the present case, this processing includes providing the target cache line specified by the request to the master L2 cache 110 by cache-to-cache intervention in advance of receipt by the snooper of the combined response at reference numeral 1020. Following receipt of the combined response, the snooper remains in a busy state (and thus protects coherence acquisition of the target cache line by the master) for the duration of the window extension 312b as shown at reference numeral 1022.

Returning to FIG. 9, following issuance of the request at block 904, L2 cache 110 concurrently monitors for both return of the requested data (e.g., from the snooping L2 cache 110 that is the HPC) and receipt of the combined response (Cresp) of the operation (blocks 906-908). In response to L2 cache 110 determining at block 908 that the combined response has been received prior to the requested data, the process of FIG. 9 proceeds to block 910 and following blocks. For clarity, this timing scenario is not explicitly illustrated in FIG. 10. However, in response to L2 cache 110 determining at block 906 that the requested data has been received prior to the combined response of the operation, the process proceeds to block 930 and following blocks, which are described below with additional reference to FIG. 10.

Referring first to block 910 and following blocks, RC machine 512 determines whether or not the combined response received for the read operation at block 908 is "good," meaning that the combined response indicates that the requested target cache line of data will be supplied to the requesting L2 cache 110 (block 910). In response to a determination at block 910 that the combined response is not a "good" combined response, the process returns to block 904, indicating that RC machine 512 will re-issue the request on the interconnect fabric. However, in response to RC machine 512 determining at block 910 that the combined response is "good", the process passes from block 910 to block 912.

Block 912 illustrates RC machine 512 opening a protection window 313, if necessary to protect transfer of coherence ownership of the target cache line from the snooper to the requesting L2 cache 110. The process then iterates at block 914 until the target cache line of data is received in the buffer in RCQ 520 corresponding to the RC machine 512. In response to receipt of the target cache line of data in the RCQ 520, L2 cache 110 places the requested data in the RCDAT buffer 522 corresponding to the RC machine 512 (block 916). In addition, at block 918, RC machine 512 performs additional processing to service the memory access request of the affiliated processor core 102, for example, by forwarding the requested data from the RCDAT buffer 522 to the processor core 102, by issuing to dispatch pipeline 506 a cache write request requesting transfer of the target cache line from the buffer in RCQ 520 to cache array 502, and/or by issuing to dispatch pipeline 506 a directory write request requesting an update the coherence state of the target cache line indicated by directory 508. At the conclusion of the processing performed by RC machine 512, the RC protection window 313 closes (ends), and the RC machine 512 is released, thereby returning the RC machine to an unbusy state (block 920). Thereafter, the process of FIG. 9 terminates at block 922 until RC machine 512 is allocated to service another memory access request.

Still referring to FIG. 9, the processing performed in response to receipt by an L2 cache 110 of requested data prior to the combined response is now described with reference to block 930 and following blocks. In response to receipt in the RCQ 520 of a data tenure 800 containing the target cache line (as shown at reference numeral 1010 of FIG. 10), L2 cache 110 places the target cache line of requested data in the RCDAT buffer 522 corresponding to the RC machine 512 (block 930). At block 932, RC machine 512 also determines whether or not data status field 802 of data tenure 800 provides an early indication of a "good" combined response that enables immediate processing of the target cache line by RC machine 512. If not, the process passes from block 932 to block 934 and following blocks. If, however, data status field 802 provides an early indication of a "good" combined response that enables immediate processing of the target cache line by RC machine 512, the process passes from block 932 to block 940 and following blocks.

Referring now to block 934 and following blocks, RC machine 512 monitors for receipt of the combined response for the request (block 934). In response to a determination at block 934 of FIG. 9 that the combined response of the request has been received, RC machine 512 determines whether or not the combined response is a "good" combined response (block 936). In response to a determination at block 936 that the combined response is not a "good" combined response, the process of FIG. 9 returns to block 904 and following blocks, which have been described. However, in response to a determination at block 936 that the combined response is a "good" combined response, the process proceeds to block 938. Block 938 illustrates RC machine 512 opening a protection window, if necessary to protect transfer of coherence ownership of the target cache line to the requesting L2 cache 110. The process then proceeds to blocks 918-922, which have been described.

Referring now to block 940 and following blocks (which is the operating scenario specifically illustrated in FIG. 10), in response to data status field 802 of data tenure 800 providing an early indication that the combined response will be a good combined response, the process proceeds to block 940. Block 940 illustrates RC machine 512 opening a protection window 1014 to protect transfer of coherence ownership of the target cache line from the snooping L2 cache 110 to the requesting L2 cache 110. It should be noted from FIG. 10 that the opening and closing of protection window 1014 is asynchronous to receipt of the combined response of the request at reference numeral 1018. In addition, as illustrated at block 942 of FIG. 9 and reference numeral 1012 of FIG. 10, RC machine 512 performs additional processing to service the memory access request of the affiliated processor core 102, for example, by returning the requested data from the RCDAT buffer 522 to processor core 102, issuing to dispatch pipeline 506 a cache write request requesting transfer of the target cache line from the buffer in RCQ 520 to cache array 502, and/or issuing to dispatch pipeline 506 a directory write request requesting an update the coherence state of the target cache line indicated by directory 508. It should be noted that, in contrast to FIG. 7, the inclusion of an early indication of the combined response in data tenure 800 enables RC machine 512 to perform useful work (and perhaps complete all of its processing) between receipt of the target cache line and receipt of the combined response. At the conclusion of the processing performed by RC machine 512, RC machine 512 closes its protection window 1014 (block 944), meaning that the master L2 cache 110 will no longer provide Retry partial responses to other competing masters requesting the target cache line and that the master L2 cache 110 is thus able to serve, if requested, as a data source for the target cache line in response to the request of a subsequent master (as indicated by reference numeral 1016). The coherence protocol is preferably constructed to favor partial responses of caches that have received write ownership of a target cache line over those of prior snoopers, which enables master L2 cache 110 to serve as a data source even in the presence of one or more prior snoopers continuing to provide a Retry partial response(s) while in the busy state depicted at reference numeral 1006. It should be noted that the time period 1016 during which the master L2 cache 110 can serve as a data source can commence prior to (and in many cases, well in advance of) receipt of combined response 1018 by the master L2 cache 110. Thus, the minimum handoff time at which a cache line can be sourced between vertical cache hierarchies is no longer defined by the request-to-combinedresponse interval as in FIG. 7, but is instead defined by the request-to-data interval as depicted in FIG. 10.

Following block 944, RC machine 512 awaits receipt of the combined response for its request, as shown at block 946 of FIG. 9 and reference numeral 1018 of FIG. 10. In response to the combined response, the tag assigned to the interconnect operation is retired, and RC machine 512 is released, thereby returning the RC machine 512 to an unbusy state (block 948) from which it can again be allocated. Thereafter, the process of FIG. 9 terminates at block 922 until RC machine 512 is allocated to service another memory access request.

As has been described, in at least one embodiment, a multiprocessor data processing system includes multiple vertical cache hierarchies supporting a plurality of processor cores, a system memory, and a system interconnect coupled to the system memory and the multiple vertical cache hierarchies. A first cache memory in a first vertical cache hierarchy issues on the system interconnect a request for a target cache line. Responsive to the request and prior to receiving a systemwide coherence response for the request, the first cache memory receives from a second cache memory in a second vertical cache hierarchy by cache-to-cache intervention the target cache line and an early indication of the systemwide coherence response for the request. In response to the early indication of the systemwide coherence response and prior to receiving the systemwide coherence response, the first cache memory initiates processing to install the target cache line in the first cache memory. In one embodiment, the first cache memory sources the target cache line to a third cache in a third vertical cache hierarchy prior to receipt of the systemwide combined response.

The present application further appreciates that the communication of an early indication of the systemwide coherence response in conjunction with an intervened cache line also facilitates fast handoff of coherence ownership of the intervened cache line in the case that multiple threads are making atomic updates to the intervened cache line. For example, consider the exemplary multithreaded program of FIG. 11, which can be executed, for example, on three concurrently executing hardware threads Ta, Tb and Tc of three different processor cores 102 of multiprocessor data processing system 200. As shown, each of threads Ta, Tb and Tc includes, in addition to other instructions generally indicated by ellipsis, an atomic update sequence 1100. The atomic update sequence 1100 within each of threads Ta, Tb and Tc begins with a respective load-and-reserve (e.g., LARX) instruction 1102a, 1102b, 1102c that, when executed, generates a corresponding LARX request to the distributed shared memory system that loads a target cache line associated with effective address A into register r1 of the executing processor core 102. The atomic update sequence 1000 of each thread next includes one or more instructions that privately modify the value of the target cache line held within register r1, where these instruction(s) are represented in the exemplary atomic update sequence by an ADD instruction 1104a, 1104b, 1104c that increments the value of register r1 by 1. The ADD instruction 1104a, 1104b, 1104c is followed by a store-conditional (e.g., STCX) instruction 1106a, 1106b, 1106c that conditionally updates the target cache line associated with address A with the modified value of register r1, depending on whether or not an intervening update was made to the target cache line since the preceding LARX instruction 1102 was executed. In this example, the executing processor core 102 resets a field of a condition code register in the processor core 102 to zero if the STCX instruction 1106 successfully updates the target cache line and sets the field of the condition code register to a non-zero value otherwise. The exemplary atomic update sequence 1000 in each thread concludes with a respective conditional branch (e.g., Branch Not Equal (BNE)) instruction 1108a, 1108b, 1108c that conditionally branches based on the value of the field in the condition code register in the processor core 102. In particular, BNE instruction 1108a, 1108b, 1108c causes execution to loop back to the load-and-reserve (e.g., LARX) instruction 1102a, 1102b, 1102c if the atomic update is unsuccessful and to proceed to subsequent instructions in the relevant thread if the atomic update is successful.

Figure 11:
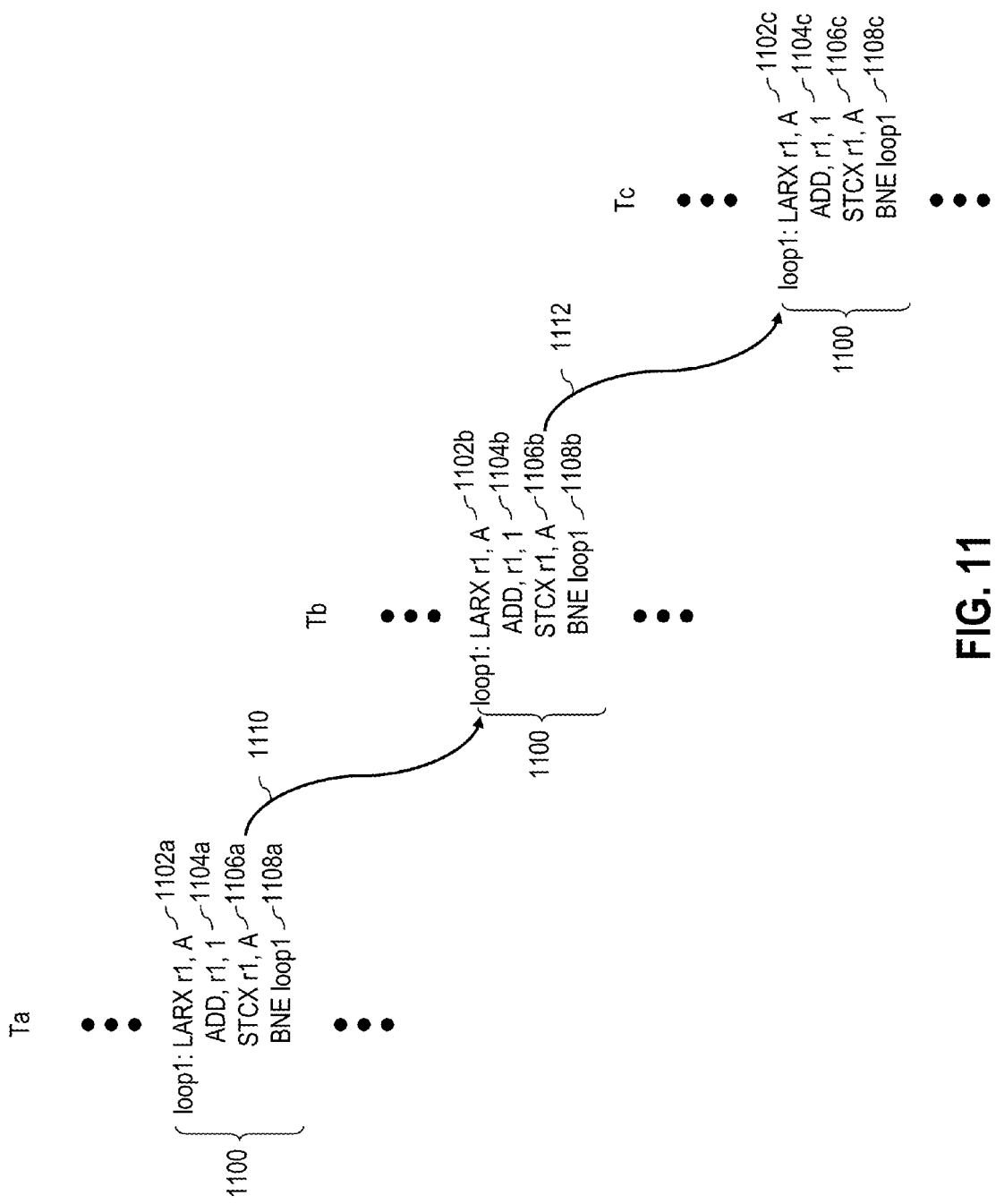
FIG. 11 illustrates an example of the use of load-and-reserve and store-conditional instructions to synchronize updates to a cache line in a multithreaded data processing system.

As further indicated in FIG. 11 by arrows 1110 and 1112, the value stored to the storage location in the distributed shared memory corresponding to effective address A by STCX instruction 1106a of thread Ta is loaded by LARX instruction 1102b of thread Tb, and the value stored to that storage location in the distributed shared memory by STCX instruction 1106b of thread Tb is loaded by LARX instruction 1102c of thread Tc. Thus, it will be appreciated that the performance of the exemplary multithreaded program depicted in FIG. 11 will be improved if the latency between storing an updated value to a target cache line in the distributed shared memory (through execution of a STCX instruction 1106) and loading the updated value of the target cache line from the distributed shared memory (through execution of a LARX instruction) can be decreased according to the teachings of the present application.

Figure 12:
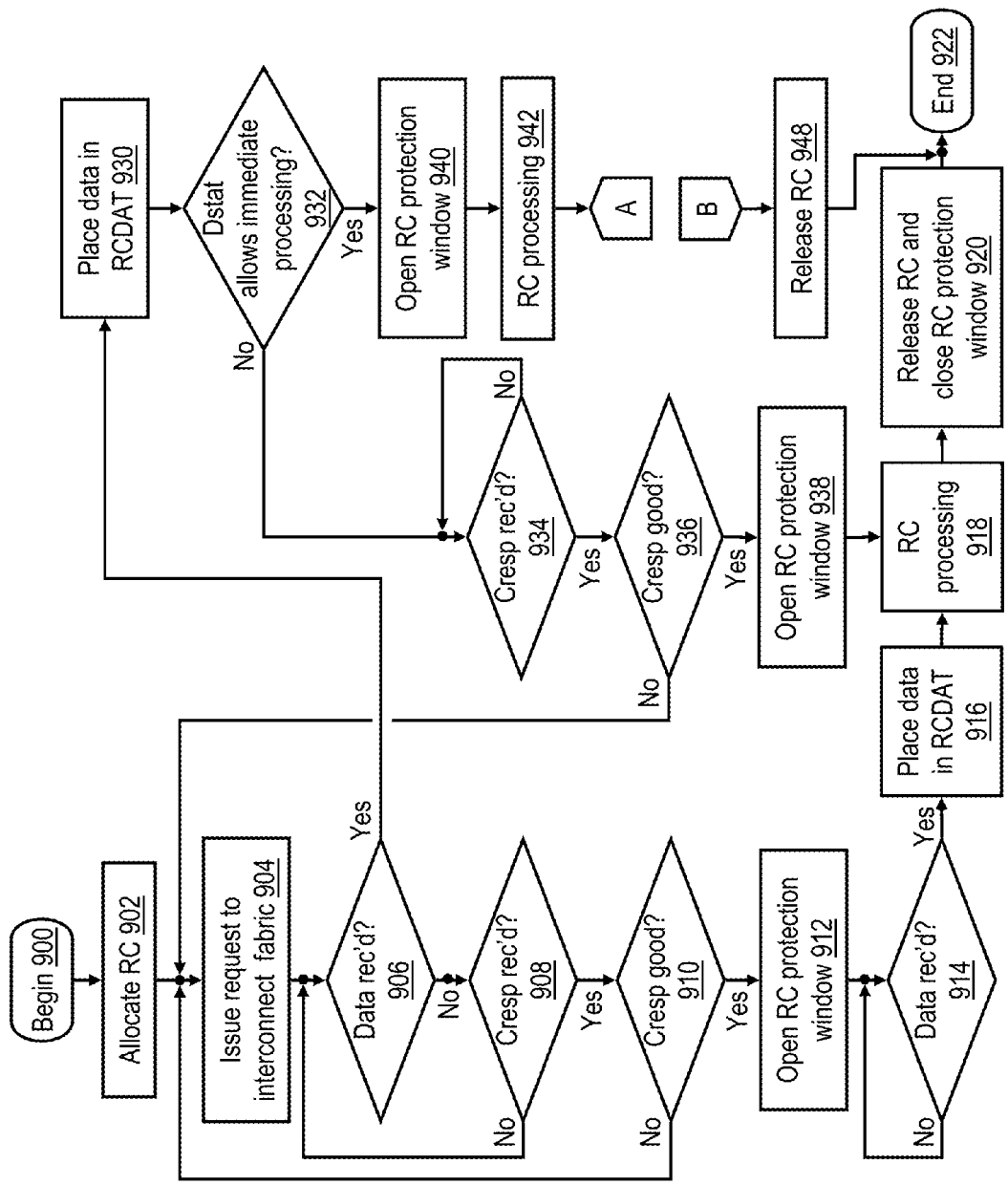
FIGS. 12-13 together form a high level logical flowchart of an exemplary process by which a read-claim (RC) machine of a lower level cache services load-and-reserve and store-conditional requests of an affiliated processor core in accordance with one embodiment.
Figure 13:
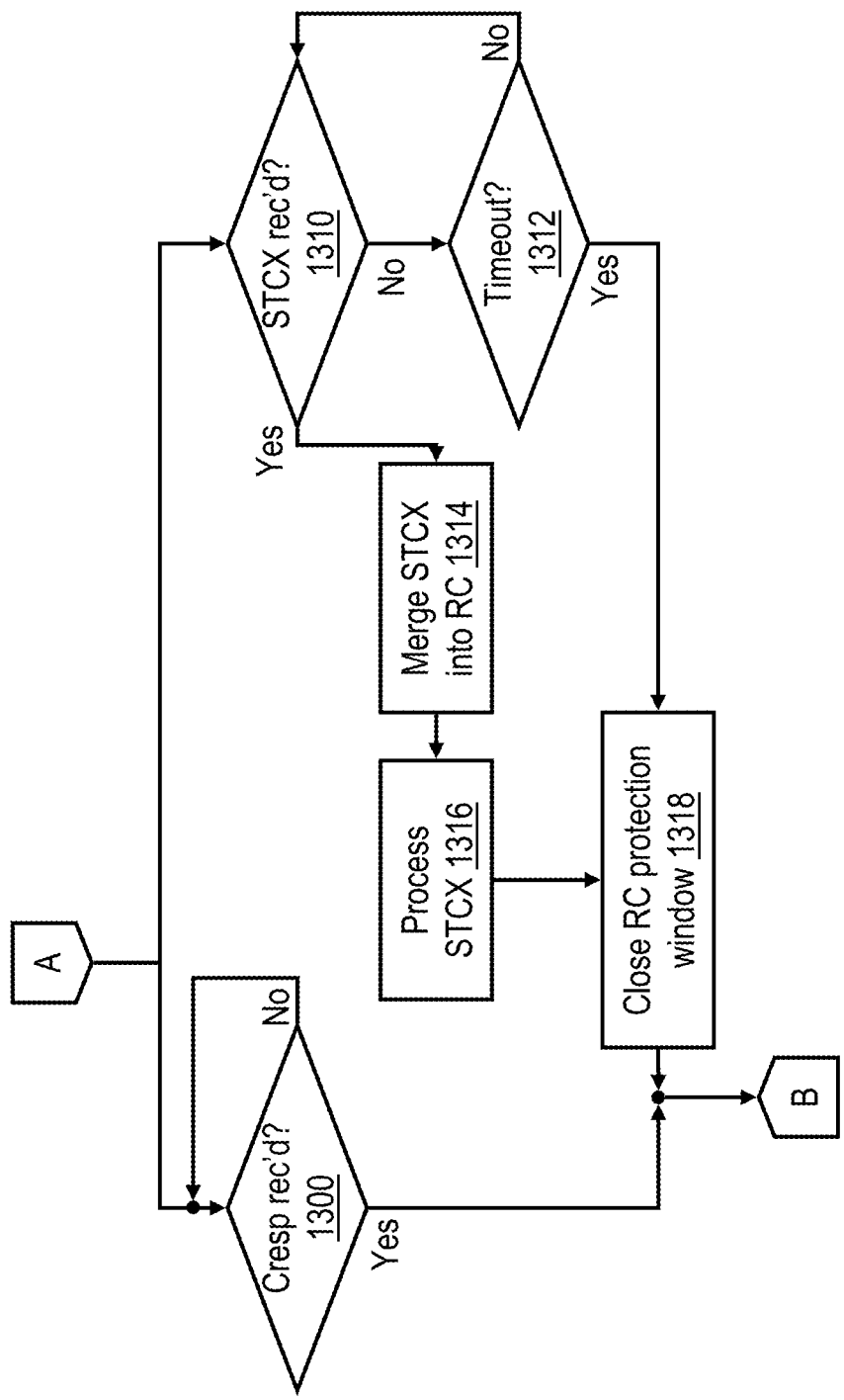

Referring now to FIGS. 12-13, there is depicted a high level logical flowchart of an exemplary process by which a RC machine 512 of a lower level cache (e.g., an L2 cache 110) services load-and-reserve (LARX) and store-conditional (STCX) requests of an affiliated processor core 102 in accordance with one embodiment. In this embodiment, a single RC machine 512 is allocated to service both a load-and-reserve request and the following store-conditional request, thus merging service of both requests into a single resource.

As indicated in FIG. 12 by like reference numerals, the processing of a RC machine 512 performed in response to receipt of a LARX request (e.g., generated by execution of a LARX instruction 1102) is substantially similar to that performed in response to other memory access requests as described above with reference to FIG. 9. Consequently, the steps performed in FIG. 12 corresponding to those earlier described with reference to FIG. 9 will not again be described in detail here. It should be noted, however, that the processing of the LARX request by an RC machine 512 at block 942 of FIG. 12 can include establishing a reservation for the target address of the LARX request in reservation logic 513. Following the processing of the LARX request by an RC machine 512 at block 942, the process of FIG. 12 passes to FIG. 13 via page connector A.

As shown in FIG. 13, the process bifurcates and proceeds in parallel to both a first path including block 1300 and a second path including blocks 1310-1318. These two paths join and return through page connector B to block 948 of FIG. 12 only after the processing illustrated in both paths is complete.

Referring first to block 1300, RC machine 512 awaits receipt of the combined response (Cresp) of the request it issued on the interconnect fabric of data processing system 200 at block 904 of FIG. 12. In response to receipt of the combined response, the first path of the process of FIG. 13 proceeds from block 1300 to the join point with the second path.

In this exemplary embodiment in which both a LARX request and an associated STCX request are merged into a single RC machine 512, RC machine 512 remains busy for a timeout interval while waiting to receive a matching STCX request specifying the same target address as the LARX request to which it was allocated. FIG. 13 illustrates this behavior at blocks 1310-1312, which depict a determination of whether a matching STCX request is received from the associated processor core 102 (block 1310) before the timeout interval expires (block 1312). If the timeout interval expires prior to receipt by dispatch pipeline 506 of a matching STCX request, an affirmative determination is made at block 1312, and the second path depicted in FIG. 13 proceeds directly from block 1312 to block 1318. Block 1318 illustrates RC machine 512 closing its protection window for the target address of the cache line reserved by the LARX request. The process then proceeds to the join point with the first path coming from block 1300. However, in response to determining at block 1310 that the RC machine 512 received a matching STCX request prior to the timeout interval elapsing, the process passes from block 1310 to block 1314, which illustrates dispatch pipeline 506 merging the STCX request into the RC machine 512 already servicing the matching LARX request.

The RC machine 512 then services the STCX request, for example, by issuing to dispatch pipeline 506 a cache write request requesting an update of the target cache line in cache array 502, and/or issuing to dispatch pipeline 506 a directory write request requesting an update the coherence state of the target cache line indicated by directory 508, and/or by resetting the reservation for the target cache line in reservation logic 513 (block 1316). Thereafter, the process proceeds to block 1318, which illustrates RC machine 512 closing its protection window for the target cache line. Thereafter, the second path process proceeds to the join point and returns through page connector B to block 948 of FIG. 12, which has been described. Thus, in the illustrated embodiment, the RC protection window closes in response to the RC machine 512 completing its processing of a STCX request or in response to failure to receive a STCX request within the timeout interval, and the RC remains busy until the later of receipt of the combined response for the interconnect operation of the LARX request and the closing of the RC protection window.

Figure 14:
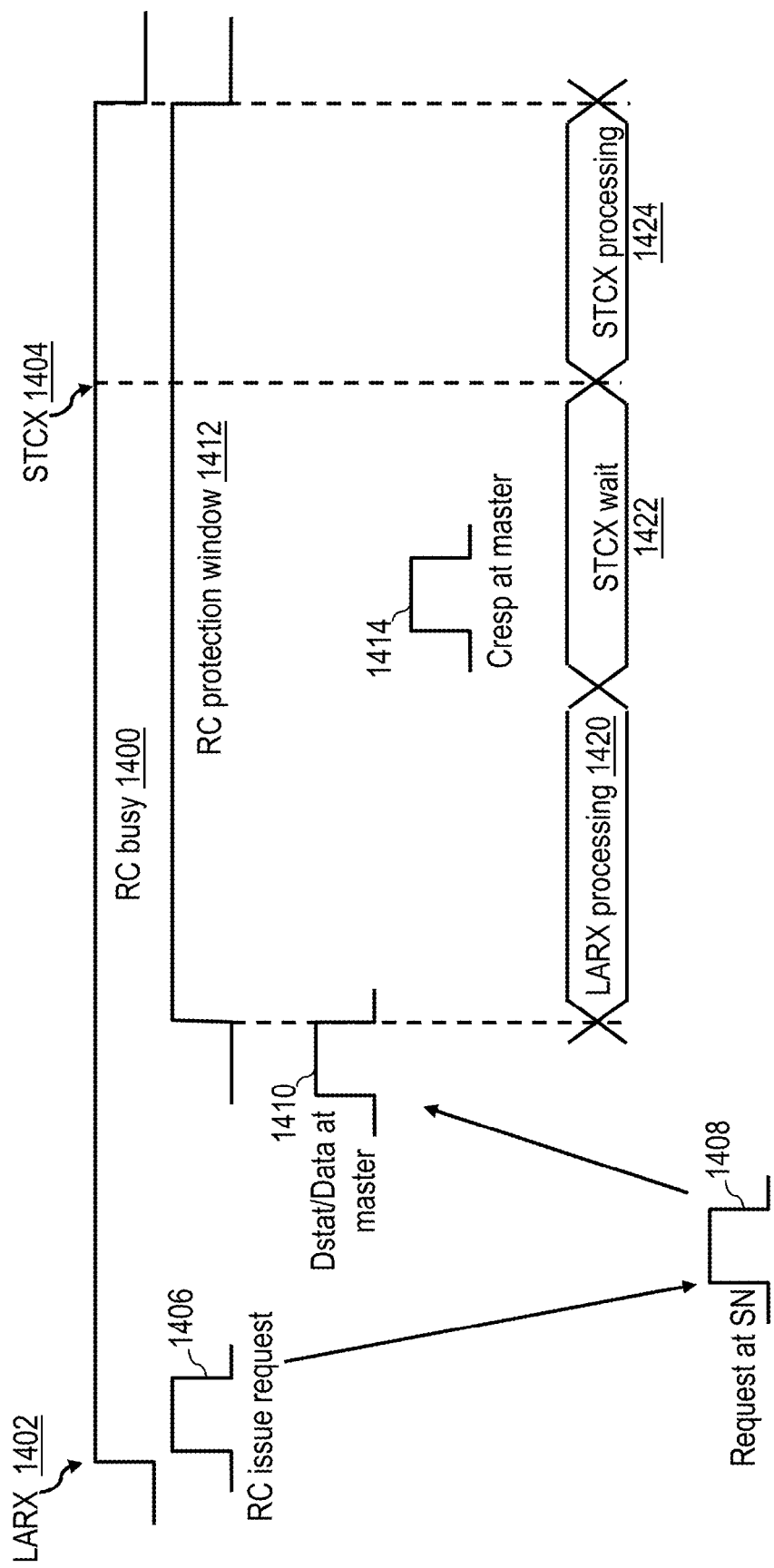
FIG. 14 is a timing diagram of an operating scenario under the process of FIGS. 12-13 in which the target cache line of a load-and-reserve request is received prior to the associated combined response, which is in turn received prior to completion of the processing of the store-conditional request.
Figure 15:
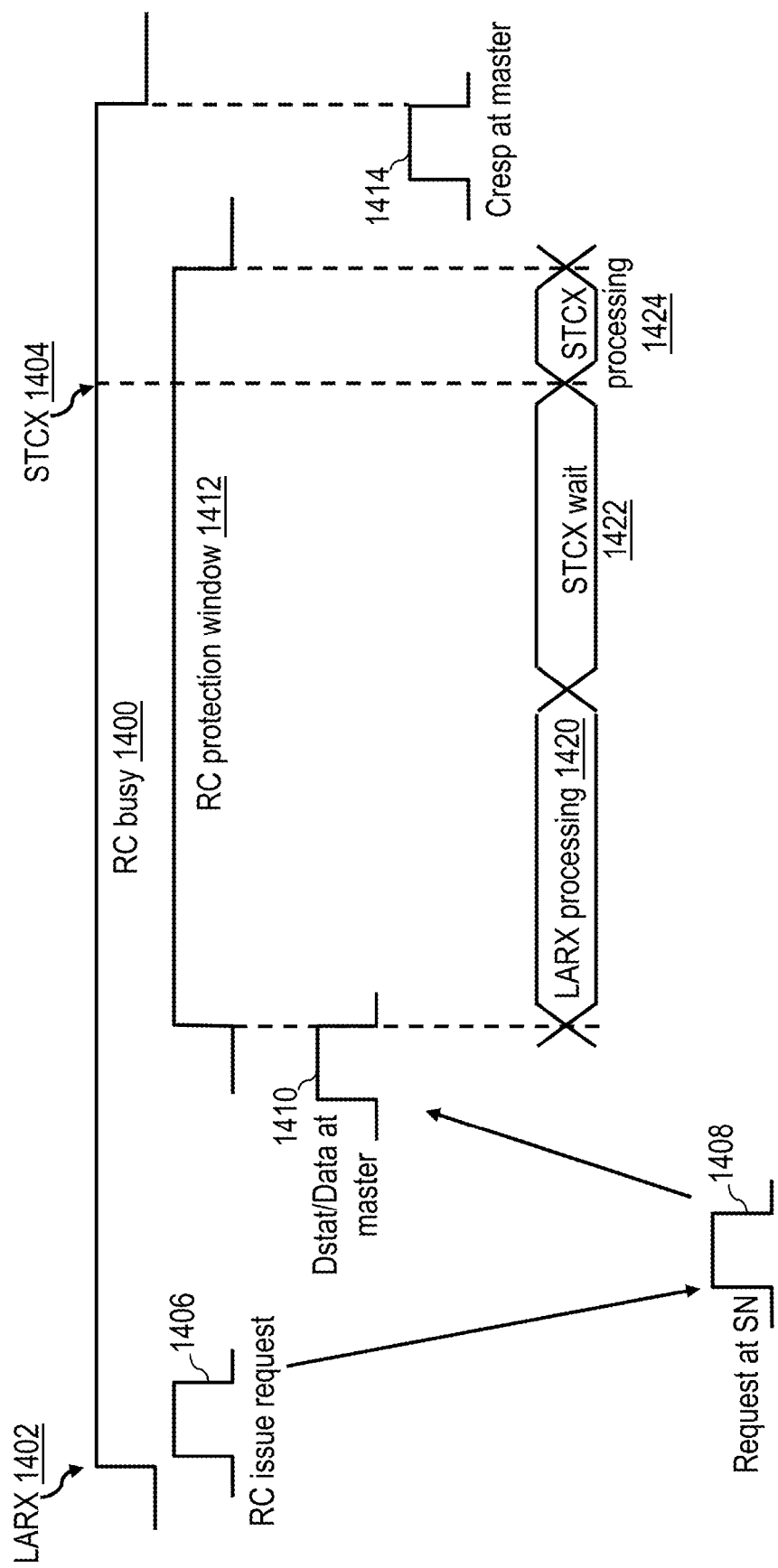
FIG. 15 is a timing diagram of an operating scenario under the process of FIGS. 12-13 in which the target cache line of a load-and-reserve request is received prior to the associated combined response, which is in turn received after completion of the processing of the store-conditional request.

Referring now to FIGS. 14-15, there is depicted timing diagrams of exemplary operating scenarios under the process of FIGS. 12-13. In FIG. 14, an early indication of the combined response of a memory access request and a target cache line of a load-and-reserve (LARX) request are received prior to the associated combined response. The combined response is in turn received prior to completion of the processing of a matching store-conditional (STCX) request (and, in some cases, prior to receipt of the STCX request). In FIG. 15, the timing of receipt of the combined response differs from that illustrated in FIG. 14 in that the combined response of the interconnect operation is received after completion of the processing of a matching STCX request.

FIGS. 14-15 illustrate that, in response to allocation of an RC machine 512 to service a LARX request, the RC machine 512 assumes a busy state 1400 at reference numeral 1402. In response to the LARX request, RC machine 512 issues a memory access request for the target cache line of the LARX request on the interconnect fabric of data processing system 200, as shown at reference numeral 1406 of FIGS. 14-15 and block 904 of FIG. 12.

This memory access request is received by snoopers throughout data processing system 200 including a servicing snooper (e.g., a snoop machine 511 of an L2 cache 110), whose receipt of the memory access request is illustrated in FIGS. 14-15 at reference numeral 1408. In response to receipt of the memory access request via the interconnect fabric, the servicing snooper returns to the requesting L2 cache 110 a data tenure 800 including a data field 804 containing the target cache line and data status field 802 providing an early indication of a "good" combined response that enables immediate processing of the target cache line by RC machine 512 (as shown at reference numeral 1410 of FIG. 14). (The servicing snooper additionally performs other processing illustrated in FIG. 10, but omitted from FIGS. 14-15 to avoid obscuring other aspects of the inventive process.)

In response to receipt at its L2 cache 110 of the early indication of a good combined response, the RC machine 512 servicing the LARX request opens an RC protection window 1412 (as illustrated at block 942 of FIG. 12). During RC protection window 1412, snoop machine 511 of the L2 cache 110 will provide Retry partial responses to any conflicting memory access requests snooped on the interconnect fabric that target the reserved cache line. In RC protection window 1412, RC machine 512 performs its processing of the LARX request, as shown at reference numeral 1420 of FIGS. 14-15 and block 942 of FIG. 12. At completion of the processing of the LARX request, the RC machine 512 does not return to an unbusy state, but instead remains in a busy state during a subsequent STCX wait window 1422 during which the RC machine 512 is awaiting dispatch of a matching STCX request, as shown at block 1310 of FIG. 13. Assuming a STCX request specifying a target address matching that of the preceding LARX request is received within the timeout interval (as shown at reference numeral 1404), the STCX request is merged into the RC machine 512, and the RC machine 512 performs the processing to service the STCX request, as shown at reference numeral 1424 of FIGS. 14-15 and blocks 1314-1316 of FIG. 13.

FIGS. 14-15 illustrate that the RC machine 512 remains in busy state 1400 until the later of receipt of the combined response 1414 for the memory access request initiated by the RC machine 512 on the interconnect fabric and the closing of RC protection window 1412. FIGS. 14-15 further illustrate that the RC protection window 1412 during which RC machine 512 protects coherence ownership of the reserved cache line by its L2 cache 110 closes in response to the RC machine 512 completing its processing of the STCX request to update the target cache line. The update of the target cache line in response to the STCX request is independent of the timing of receipt of the combined response, and because the STCX request will usually result in a hit in L2 cache 110, the update to the target cache line can often be completed prior to receiving the combined response for the memory access request (as shown in FIG. 15). The L2 cache 110 that has updated the target cache line can thus serve as a source of the target cache line as soon as RC protection window 1412 closes, which as shown in FIG. 15 can be well in advance of receipt of the combined response 1414 of the memory access request initiated by RC machine 512.

Figures 16, 17:
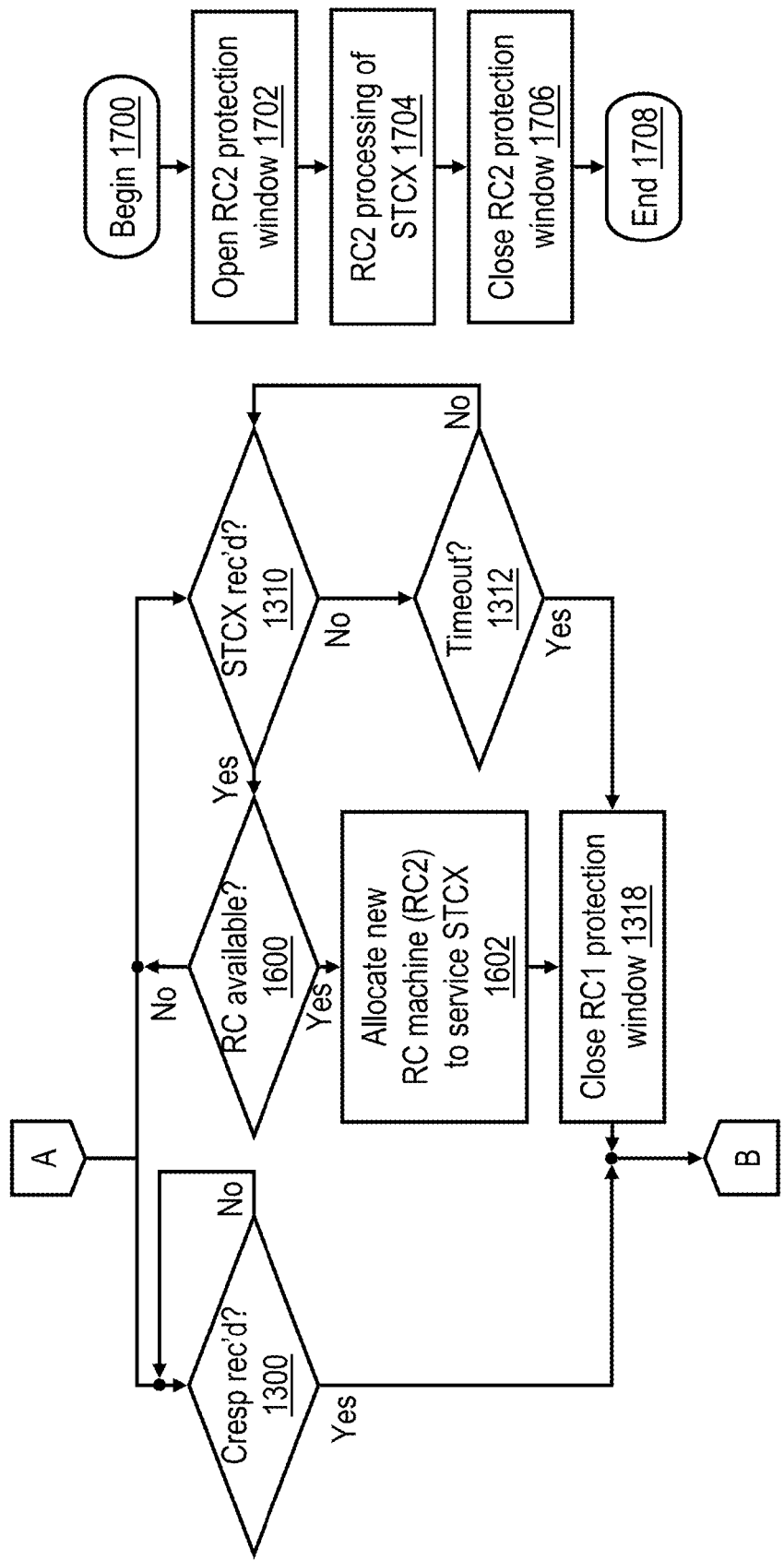
FIG. 16 illustrates an alternative embodiment of the process of FIG. 13 in which a lower level cache allocates another RC machine to service a store-conditional request of an affiliated processor core rather than utilizing the same RC machine that serviced the preceding load-and-reserve request.
FIG. 17 is a high level logical flowchart of a process by which an RC machine of a lower level cache services a store-conditional request of an affiliated processor core in the embodiment of FIG. 16.

Referring now to FIG. 16, there is depicted an alternative embodiment of the process of FIG. 13. In this alternative embodiment, an L2 cache 110 allocates another of its RC machines 512 to service a matching STCX request of the affiliated processor core 102 rather than merging the STCX request into the same RC machine 512 servicing the preceding LARX request. As indicated by like reference numerals, the process of FIG. 16 is substantially similar to that performed in FIG. 13. Consequently, the steps performed in FIG. 16 corresponding to those earlier described with reference to FIG. 13 will not again be described in detail here.

At block 1310 of FIG. 16, in response to receipt by an L2 cache 110 of a matching STCX request from the associated processor core 102 while an RC machine 512 (referred to herein as RC1) remains in the busy state initiated by the preceding LARX request, the process passes from block 1310 to block 1600. Block 1600 illustrates a determination of whether any RC machine 512 of the L2 cache 110 is in an unbusy (available) state. If not, the dispatch pipeline 506 discards the STCX request received at block 1310 and returns a retry indication to the processor core 102 (not illustrated). The process of FIG. 16 then returns to block 1310, which has been described. In response, however, to an affirmative determination at block 1600, the dispatch pipeline 506 of the L2 cache 110 allocates another RC machine 512 (referred to herein as RC2) to service the STCX request, as shown at block 1602. Thereafter, the process of FIG. 16 passes to block 1318, which has been described.

With reference now to FIG. 17, there is illustrated a high level logical flowchart of a process by which an RC machine 512 (i.e., RC2) of an L2 cache 110 services a store-conditional (STCX) request of an affiliated processor core 102 in the embodiment of FIG. 16. The process of FIG. 17 begins at block 1700, for example, in response to the dispatch pipeline 506 of an L2 cache 110 allocating RC machine RC2 to service a STCX request at block 1602 of FIG. 16. The process then proceeds to block 1702, which illustrates RC machine RC2 opening a protection window 1014 to protect coherence ownership of the target cache line by its L2 cache 110. In addition, RC machine RC2 services the STCX request, for example, by issuing to dispatch pipeline 506 a cache write request requesting an update of the target cache line in cache array 502, and/or issuing to dispatch pipeline 506 a directory write request requesting an update the coherence state of the target cache line indicated by directory 508, and/or by resetting the reservation for the target cache line in reservation logic 513 among other things (block 1704). In at least some embodiments, the directory write request updates the coherence state to a coherence state that makes the target cache line more likely to be sourced by the L2 cache 110 to another L2 cache 110 by cache-to-cache intervention in a coherence state that allows a store to complete immediately. Following block 1704, the process proceeds to block 1706, which illustrates RC machine RC2 closing its protection window for the target cache line. Thereafter, the process of FIG. 17 ends at block 1708.

Figure 18:
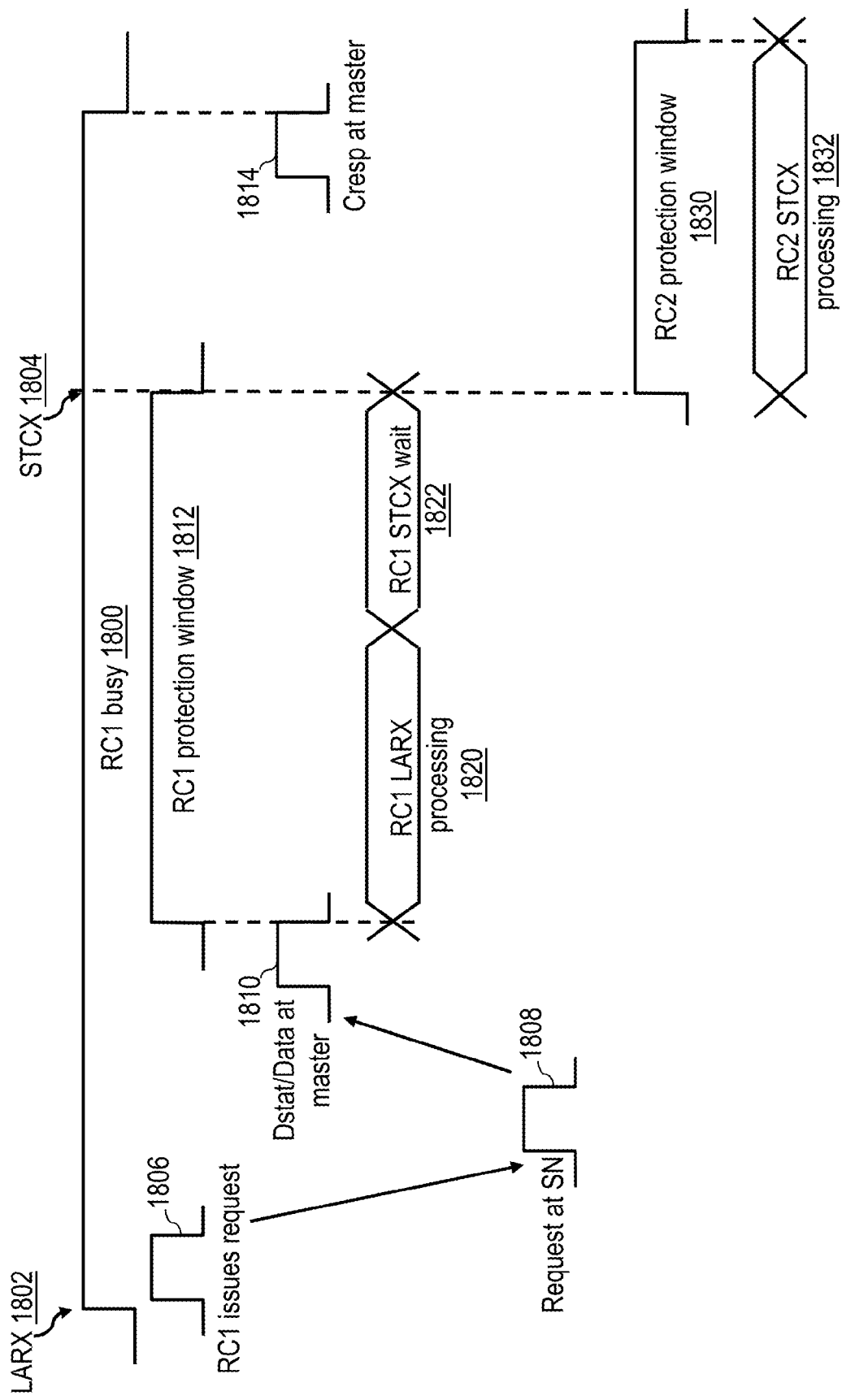
FIG. 18 is a timing diagram of an operating scenario under the process of FIGS. 12 and 16 in which the target cache line of a load-and-reserve request is received prior to the associated combined response.

Referring now to FIG. 18, there is depicted a timing diagram of an exemplary operating scenario according the processes illustrated in FIGS. 12, 16 and 17 in which an early indication of the combined response of a memory access request is received in conjunction with the target cache line of a load-and-reserve (LARX) request prior to the associated combined response.

FIG. 18 illustrates that, in response to allocation of an RC machine RC1 to service a LARX request, the RC machine RC1 assumes a busy state 1800 at reference numeral 1802. In response to the LARX request, RC machine RC1 issues a memory access request for the target cache line of the LARX request on the interconnect fabric of data processing system 200, as shown at reference numeral 1806 of FIG. 18 and block 904 of FIG. 12.

This memory access request is received by snoopers throughout data processing system 200 including a servicing snooper (e.g., a snoop machine 511 of an L2 cache 110), whose receipt of the memory access request is illustrated in FIG. 18 at reference numeral 1808. In response to receipt of the memory access request via the interconnect fabric, the servicing snooper returns to the requesting L2 cache 110 a data tenure 800 including a data field 804 containing the target cache line and data status field 802 providing an early indication of a "good" combined response that enables immediate processing of the target cache line by RC machine 512 (as shown at reference numeral 1810 of FIG. 18). (The servicing snooper additionally performs other processing illustrated in FIG. 10, but omitted from FIG. 18 to avoid obscuring other aspects of the inventive process.)

In response to receipt at its L2 cache 110 of the early indication of a good combined response, the RC machine RC1 opens an RC1 protection window 1812 (as illustrated at block 940 of FIG. 12) during which snoop machines 511 of L2 cache 110 provide Retry partial responses to any conflicting memory access requests snooped on the system interconnect that target the reserved cache line. RC1 protection window 1812 remains open for both an RC1 LARX processing interval 1820 during which RC1 performs its processing of the LARX request and a subsequent RC1 STCX wait interval 1822 during which L2 cache 110 awaits receipt of a STCX request from the associated processor core 102 specifying a target address matching that of the earlier LARX request. At completion of RC1 STCX wait interval 1822, RC1 protection window 1812 closes, terminating protection of coherence ownership of the target cache line by RC1. However, RC1 does not necessarily immediately return to an unbusy state, but instead remains in a busy state until the later of receipt of the combined response 1814 for its memory access request and end of RC1 STCX wait interval 1822.

In response to receipt by the L2 cache 110 of the STCX request from the associated processor core 102 (as illustrated at reference numeral 1804), dispatch pipeline 506 allocates another RC machine RC2 to service the STCX request (as shown at block 1602). In response to allocation of RC machine RC2 to service the STCX request, RC2 opens an RC2 protection 1830 during which RC2 protects coherence ownership of the target cache line by its L2 cache 110, as also illustrated at block 1702 of FIG. 17. During RC2 protection window 1830, RC2 performs its processing of the STCX request to update the target cache line, as shown at reference numeral 1832. RC2 closes its RC2 protection window 1830 in response to completion of the processing for the STCX request, as illustrated at block 1706 of FIG. 17.

It should be noted that the L2 cache 110 that has updated the target cache line can serve as a data source of the target cache line (e.g., by cache-to-cache intervention to another L2 cache 110) as soon as RC2 protection window 1832 closes, which can be in advance of receipt of the combined response 1814 of the memory access request initiated by RC machine RC1. It should also be noted that the update of the target cache line by RC machine RC2 in response to the STCX request is also independent of the timing of receipt of the combined response, and because the STCX request will usually result in a hit in L2 cache 110, the update to the target cache line can be completed prior to receiving the combined response for the memory access request.

Figure 19:
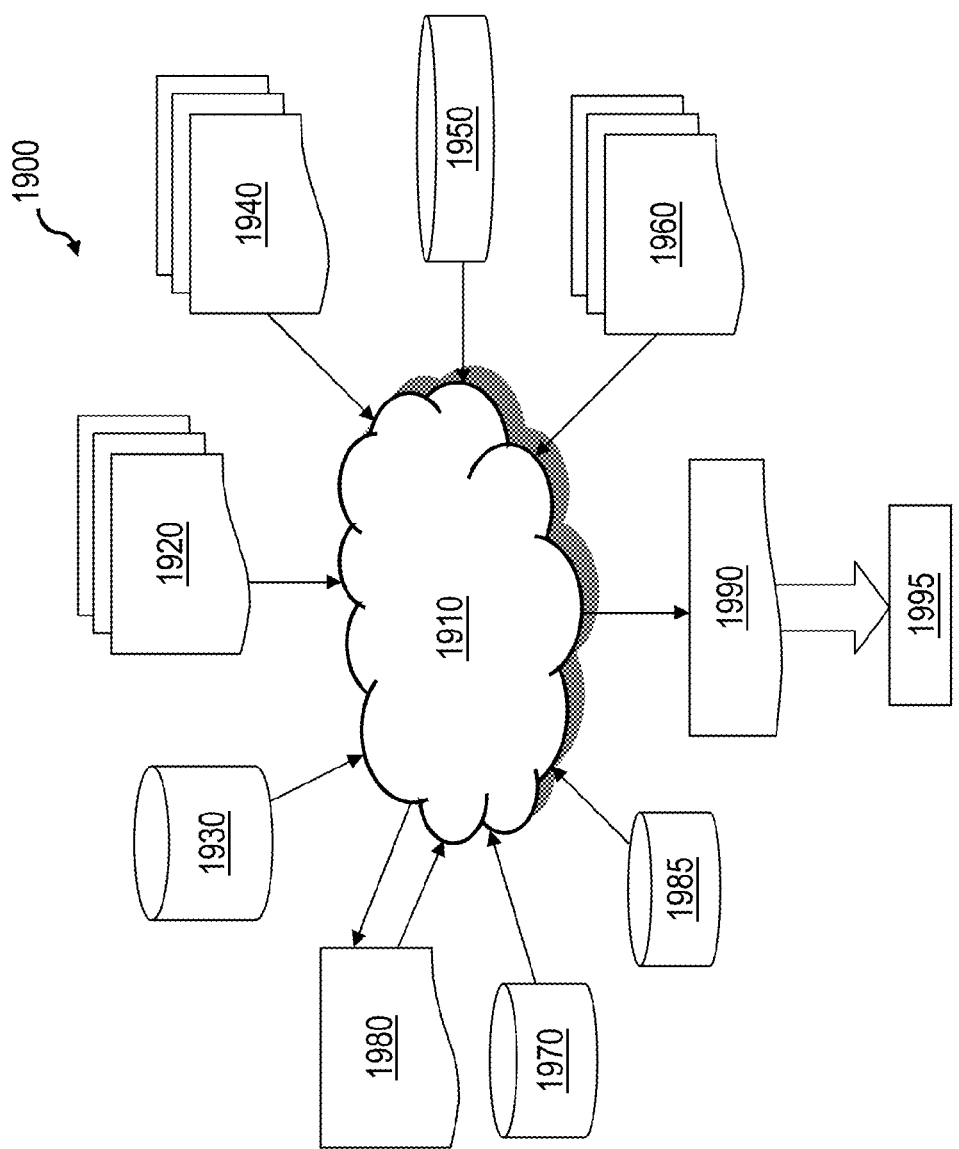
FIG. 19 illustrates an exemplary design process in accordance with one embodiment.

With reference now to FIG. 19, there is depicted a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above and shown herein. The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 19 illustrates multiple such design structures including an input design structure 1020 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/ designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as those shown herein. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures shown herein to generate a netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1910 may include hardware and software modules for processing a variety of input data structure types including netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1940, characterization data 1950, verification data 1960, design rules 19190, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1990 may comprise a compiled, executable HDL simulation model that functionally simulates the devices shown herein.

Design structure 1990 may also employ a data format used for the exchange of layout data of integrated circuits and/or symbolic data format (e.g., information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1990 may then proceed to a stage 1995 where, for example, design structure 1990: proceeds to tape-out, is released to manufacturing, is released to a mask house, is sent to another design house, is sent back to the customer, etc.

As has been described, in at least one embodiment, a multiprocessor data processing system includes multiple vertical cache hierarchies supporting a plurality of processor cores, a system memory, and a system interconnect. In response to a load-and-reserve request from a first processor core, a first cache memory supporting the first processor core issues on the system interconnect a memory access request for a target cache line of the load-and-reserve request. Responsive to the memory access request and prior to receiving a systemwide coherence response for the memory access request, the first cache memory receives from a second cache memory in a second vertical cache hierarchy by cache-to-cache intervention the target cache line and an early indication of the systemwide coherence response for the memory access request. In response to the early indication and prior to receiving the systemwide coherence response, the first cache memory initiating processing to update the target cache line in the first cache memory.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a multiprocessor data processing system including multiple vertical cache hierarchies supporting a plurality of processor cores, a system memory, and a system interconnect coupled to the system memory and the multiple vertical cache hierarchies, the method comprising:

in response to receipt of a load-and-reserve request from a first processor core, a first cache memory in a first vertical cache hierarchy supporting the first processor core issuing on the system interconnect an interconnect memory access request for a target cache line of the load-and-reserve request;

responsive to the interconnect memory access request and prior to receiving a systemwide coherence response for the interconnect memory access request, the first cache memory receiving from a second cache memory in a second vertical cache hierarchy by cache-to-cache intervention the target cache line and an early indication of the systemwide coherence response for the interconnect memory access request; and in response to receiving a store-conditional request from the first processor core and the early indication of the systemwide coherence response, and prior to receiving the systemwide coherence response, the first cache memory initiating servicing of the store-conditional request to update the target cache line in the first cache memory.

2. The method of claim 1, and further comprising:
the first cache memory sourcing the target cache line to a third cache in a third vertical cache hierarchy prior to receipt of the systemwide combined response.

3. The method of claim 1, and further comprising:
in response to receipt of the early indication of the systemwide coherence response, the first cache memory commencing a protection window in which the first cache memory protects its acquisition of coherence ownership of the target cache line; and
continuing the protection window for at least a wait interval following processing of the load-and-reserve request during which the first cache memory awaits receipt of the store-conditional request from the first processor core.

4. The method of claim 3, and further comprising ending the protection window asynchronously to receipt by the first cache memory of the systemwide coherence response in response to completion of processing of the store-conditional request.

5. The method of claim 3, wherein:
the protection window is a first protection window; and
the method further comprises ending the first protection window asynchronously to receipt by the first cache memory of the systemwide coherence response in response to initiation of a second protection window by the first cache memory in response to receipt of the store-conditional request.

6. The method of claim 3, and further comprising:
the first cache memory allocating a read-claim state machine to manage the interconnect memory access request in response to receipt of the load-and reserve request from the first processor core; and
the first cache memory deallocating the read-claim state machine in response to a later to occur of receipt of the systemwide coherence response and ending of the protection window.

7. A processing unit for a multiprocessor data processing system, the processing unit comprising:
a processor core;
interconnect logic configured to couple the processing unit to a system interconnect of the multiprocessor data processing system;
a first vertical cache hierarchy supporting the processor core, the first vertical cache hierarchy including a first cache memory that is configured to:
in response to receipt of a load-and-reserve request from the processor core, issue on the system interconnect an interconnect memory access request for a target cache line of the load-and-reserve request;
responsive to the interconnect memory access request and prior to receiving a systemwide coherence response for the interconnect memory access request, receive from a second cache memory in a second vertical cache hierarchy by cache-to-cache intervention the target cache line and an early indication of the systemwide coherence response for the interconnect memory access request; and in response to receiving a store-conditional request from the first processor core and the early indication of the systemwide coherence response, and prior to receiving the systemwide coherence response, initiate servicing of the store-conditional request to update the target cache line in the first cache memory.

8. The processing unit of claim 7, wherein the first cache memory is further configured to source the target cache line to a third cache in a third vertical cache hierarchy prior to receipt of the systemwide combined response.

9. The processing unit of claim 7, wherein the first cache memory is further configured to:

in response to receipt of the early indication of the systemwide coherence response, commence a protection window in which the first cache memory protects its acquisition of coherence ownership of the target cache line; and continue the protection window for at least a wait interval following processing of the load-and-reserve request during which the first cache memory awaits receipt of the store-conditional request from the first processor core.

10. The processing unit of claim 9, wherein the first cache memory is further configured to end the protection window asynchronously to receipt by the first cache memory of the systemwide coherence response in response to completion of processing of the store-conditional request.

11. The processing unit of claim 9, wherein:

the protection window is a first protection window; and the first cache memory is further configured to end the first protection window asynchronously to receipt by the first cache memory of the systemwide coherence response in response to initiation of a second protection window by the first cache memory in response to receipt of the store-conditional request.

12. The processing unit of claim 9, wherein the first cache memory is further configured to:

allocate a read-claim state machine to manage the interconnect memory access request in response to receipt of the load-and reserve request from the first processor core; and deallocate the read-claim state machine in response to a later to occur of receipt of the systemwide coherence response and ending of the protection window.

13. A multiprocessing data processing system, comprising:

first, second and third processing units in accordance with claim 7; and the system interconnect coupling the first, second and third processing units.

14. A design structure tangibly embodied in a machine-readable storage device for designing, manufacturing, or testing an integrated circuit, the design structure comprising:

a processing unit for a multiprocessor data processing system, the processing unit comprising:

a processor core;

interconnect logic configured to couple the processing unit to a system interconnect of the multiprocessor data processing system;

a first vertical cache hierarchy supporting the processor core, the first vertical cache hierarchy including a first cache memory that is configured to:

in response to receipt of a load-and-reserve request from the processor core, issue on the system interconnect an interconnect memory access request for a target cache line of the load-and-reserve request;

responsive to the interconnect memory access request and prior to receiving a systemwide coherence response for the interconnect memory access request, receive from a second cache memory in a second vertical cache hierarchy by cache-to-cache intervention the target cache line and an early indication of the systemwide coherence response for the interconnect memory access request; and in response to receiving a store-conditional request from the first processor core and the early indication of the systemwide coherence response and prior to receiving the systemwide coherence response, initiate servicing of the store-conditional request to update the target cache line in the first cache memory.

15. The design structure of claim 14, wherein the first cache memory is further configured to source the target cache line to a third cache in a third vertical cache hierarchy prior to receipt of the systemwide combined response.

16. The design structure of claim 14, wherein the first cache memory is further configured to:

in response to receipt of the early indication of the systemwide coherence response, commence a protection window in which the first cache memory protects its acquisition of coherence ownership of the target cache line; and continue the protection window for at least a wait interval following processing of the load-and-reserve request during which the first cache memory awaits receipt of the store-conditional request from the first processor core.

17. The design structure of claim 16, wherein the first cache memory is further configured to end the protection window asynchronously to receipt by the first cache memory of the systemwide coherence response in response to completion of processing of the store-conditional request.

18. The design structure of claim 16, wherein:

the protection window is a first protection window; and the first cache memory is further configured to end the first protection window asynchronously to receipt by the first cache memory of the systemwide coherence response in response to initiation of a second protection window by the first cache memory in response to receipt of the store-conditional request.

* * * * *